United States Patent
Das Gupta et al.

(10) Patent No.: US 8,194,918 B2
(45) Date of Patent: Jun. 5, 2012

(54) EMBEDDED MESSAGE EXTRACTION FOR VISIBLE WATERMARKING

(75) Inventors: Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 12/701,349

(22) Filed: Feb. 5, 2010

(65) Prior Publication Data

US 2011/0194726 A1    Aug. 11, 2011

(51) Int. Cl.
*G06K 9/00* (2006.01)
(52) U.S. Cl. ........................................................ 382/100
(58) Field of Classification Search .................... 382/100
See application file for complete search history.

(56) References Cited

U.S. PATENT DOCUMENTS

| | | | |
|---|---|---|---|
| 4,965,744 A | 10/1990 | Wagatsuma et al. | |
| 5,530,759 A | 6/1996 | Braudaway et al. | |
| 6,208,745 B1 * | 3/2001 | Florencio et al. | 382/100 |
| 6,222,932 B1 | 4/2001 | Rao et al. | |
| 6,263,086 B1 | 7/2001 | Wang | |
| 6,526,155 B1 | 2/2003 | Wang et al. | |
| 6,603,576 B1 * | 8/2003 | Nakamura et al. | 358/3.28 |
| 2002/0102007 A1 | 8/2002 | Wang | |
| 2002/0106103 A1 | 8/2002 | Jones et al. | |
| 2003/0210803 A1 | 11/2003 | Kaneda et al. | |
| 2004/0008377 A1 | 1/2004 | Cheng et al. | |
| 2005/0094844 A1 * | 5/2005 | Damera-Venkata | 382/100 |
| 2005/0286765 A1 | 12/2005 | Nakayama | |
| 2008/0205697 A1 * | 8/2008 | Sakai et al. | 382/100 |
| 2011/0194690 A1 * | 8/2011 | Das Gupta et al. | 380/246 |
| 2011/0194725 A1 * | 8/2011 | Das Gupta et al. | 382/100 |

* cited by examiner

*Primary Examiner* — Claire X Wang

(57) ABSTRACT

A watermarking system uses distinct bit patterns to identify a logic 0, a logic 1, and a marker bit, which demarcates segments of logic bit information. Marker bits, which are printed on both foreground and background areas of an image, outline message blocks. In message extraction, a preprocessing step removes any white boarders, identifies the best defined corner of a message block, crops the image, and rotates the image to place the identified corner at the top-left corner. Message extraction scans the rotated image in window segments of increasing size during multiple cycles. During each cycle, if a bit pattern cannot be identified as a data bit, then the size of the examined bit area is increased and rechecked to see it specifically is a marker bit. If no bit information can be definitively identified, then it is assigned a logic bit value based on a 50% random assignment.

23 Claims, 27 Drawing Sheets

Binarized bit image of a
recovered skeleton pattern
of Bit-Pattern Symbol 13
(Logic 0)

After filling in the interior
and border areas defined
by the skeleton pattern

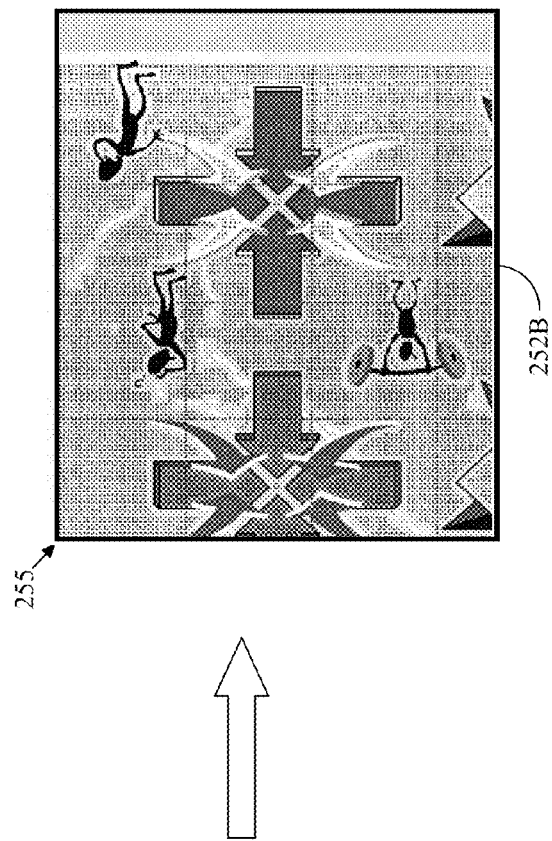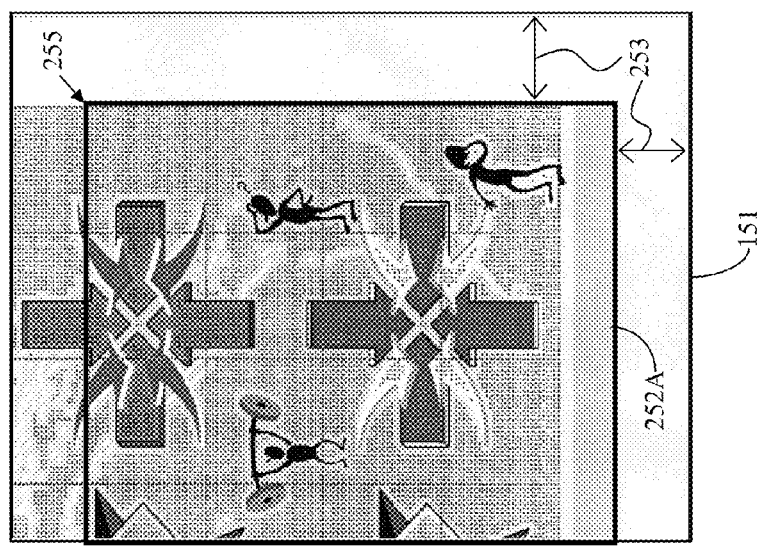
Fig. 26

EMBEDDED MESSAGE EXTRACTION FOR VISIBLE WATERMARKING

CROSS-REFERENCE TO RELATED APPLICATIONS

This application is related to U.S. Patent Applications entitled "A Novel Bit Pattern Design For Visible Watermarking," Ser. No. 12/701,290 and "Data Adaptive Message Embedding for Visible Watermarking," Ser. No. 12/701,311 filed on the same day as the present application, which are incorporated by reference herein in their entirety.

BACKGROUND

1. Field of Invention

The present invention is geared toward the field of watermarking scanned images, and in particular, is geared toward inserting watermark codes onto an input image and extracting watermark codes from the input image, 2. Description of Related Art Visible watermarking is the science of overlaying messages comprised of bit-encoded, character strings onto a user-provided image (i.e. an input image) prior to printing the input image. The resultant, printed image is a watermarked image, and it is said to have been watermarked with a secret, or hidden, watermark message. The principle motivation behind such encoding is that when properly encoded, the watermark message can be extracted from a scan of the previously-printed, watermarked image.

Visible watermarking schemes can be useful in many scenarios, such as having a user ID encoded onto documents while printing from a network printer, having the date and time of printing inconspicuously placed on a printed document, etc.

Although watermark messages may be incorporated as textual messages overlaid on an output image, it is preferred that the watermark message not be readily discernable by a casual viewer of the output image. That is, it is typically preferred that the watermark message not be printed using text characters, which can be freely read since such a message is likely to become a distraction to a casual viewer; moving the casual view's attention away from the output image itself. It is therefore customary to first encode the watermark message using an encoding scheme that is not readily discernable by a casual viewer, and then to overlay the encoded message on the output image. Preferably, the encoded message should be innocuous to the casual viewer and not divert attention from the main subject matter of the output image.

One typical method of encoding a message is to use the standard ASCII code, which is known in the art to provide a distinct eight-bit, binary code per text character. In this way, the ASCII encoded message may be printed as a series of 0's and 1's overlaid on the output image, and is not easily discernable by a casual viewer. However, it is typically not an optimal solution to clutter an output image with a series of 0's and 1's detectable by the human eye.

One approach to hiding the encoded message is to encode the watermark message into text characters that may already be a part of the output image. In this approach, an existing text character within the output image is divided into an upper region and a lower region, and relative darkness levels of the two regions are modulated to inscribe the encoded watermark message. For example, the upper region of a text character may be made darker than its lower region to represent a logic-0. Alternatively, the lower region of a text character may be made darker than its upper region to represent a logic-1.

This approach succeeds in effectively hiding the watermark message from a casual reader of the output document, but to some extent, it may be dependent upon the quality of scanning and printing equipment used to process the watermarked output image to successfully inscribe the watermarked message and to successfully extract the watermarked message after multiple scan-and-print cycles.

SUMMARY OF INVENTION

The present invention takes an alternate approach to solving the above described problem. This alternative approach is to define new printable pattern symbols to represent individual data bits (i.e. logic 0 bits and logic 1 bits) in a data bit-string that defines an encoded, character-string message. Since the newly defined printable pattern symbols would not be known to a casual observer of the output image, they would pose a lower level of distraction. Thus, the watermark message (preferably a bit-string comprising a bit-encoded, text message) may be overlaid as a series of printable pattern symbols onto the input image to create a watermarked image with pattern symbols that are visible, but not decipherable, by human eyes.

One aspect of the present invention is a method inserting watermark codes onto an input image and extracting watermark codes from the input image, comprising: inserting watermark code onto said input image by: providing at least one mask block indicating regions of said input image upon which said watermark codes may be written; providing a message block containing said watermark codes; dividing said input image into at least one image block, where the number of image blocks corresponding to the number of mask blocks; assign a one-to-one relationship between said mask Blocks and corresponding image blocks; for each image block, applying the following steps: (I) using the current image block's corresponding mask block to create a mask-filtered block; (II) sub-dividing said mask-filtered block into "message-pattern-size" sub-blocks of equal size and dimension as a corresponding current message block, each message-pattern-size sub-block being divisible into a plurality of pattern image segments having a one-to-one correspondence with the watermark codes in its corresponding message block; (III) for each message-pattern-size sub-block, cycling through each watermark code in its corresponding message block, and if the message-pattern-size sub-block indicates that the pattern image segment corresponding to the current watermark code is suitable for writing, then writing said watermark code within the image pattern image segment; and extracting watermark codes from the input image by: applying a pre-processing sequence to said input image to at least assure that said watermark codes are readable in a pre-defined orientation beginning from a predefined corner of the input image's current orientation; converting said input image to a single channel digital image; generating a gradient image from said single channel digital image; defining a memory space hold an extracted message; defining a lower intensity threshold and an upper intensity threshold, setting a current threshold equal to said lower intensity threshold; if said current intensity threshold is not greater than said upper intensity threshold, then repeating the following sub-steps, in sequence, until the current intensity threshold is greater than said upper intensity threshold: (a) increasing said current intensity threshold by a predefined, fixed amount; (b) binarizing said gradient image using said current intensity threshold to create a binarized image; (c) applying a message extraction routine to said binarized image and identifying the message extracted by the message extraction routine as a new_message; (d) if the new_message has a higher confidence of accuracy than the current contents in said memory space, then storing said new_message in said memory space; and defining the contents of said memory space as the deciphered watermark code.

Preferably in step (III), if the message-pattern-size sub-block indicates that the pattern image segment corresponding to the current watermark code is not suitable for writing then determining if the watermark mark code is data bit or a marker bit, and if the watermark code is a data bit then not writing said watermark code within said image pattern segment, else if the watermark code is a marker bit then writing said watermark code within said image pattern segment irrespective of what the message-pattern-size sub-block indicates.

Further preferably, the intensity of the watermark code written within a corresponding image pattern image segment is made darker than its surrounding pixels if the average intensity of its surrounding pixels is not less than 255.

Additionally, the intensity of the watermark code written within a corresponding image pattern image segment is made lighter than its surrounding pixels if the average intensity of its surrounding pixels is not more than 35.

It is presently further preferred that the watermark code is arranged into message blocks of a common fixed size and distributed over said input image, and that the pre-processing sequence includes the following sequential sub-steps: (i) etting a current_corner_confidence parameter equal to 0; (ii) setting a block_size multiplier equal to 1; (iii) defining a first memory space to store a best_corner_row_ID parameter, a second memory space to store a best_corner_column_ID parameter, and a third memory space to store a best_corner_rotation_angle parameter; (iv) defining a fixed series of rotation angles; (v) IF said block_size is less than a predefined value, THEN incrementing said block_size by a fixed increment value; ELSE skip to sub-step (xiii); (vi) setting a current_rotation_angle parameter equal to the first angle in said fixed series of rotation angles; (vii) IF the current_rotation_angle is equal to the last angle within said fixed series of rotation angles, THEN return to sub-step (v), ELSE IF the current_rotation_angle is not equal to the first angle within said fixed series of rotation angles THEN setting said current_rotation_angle parameter equal to the next angle in said fixed series of rotation angles; (viii) rotating said input image by said current_rotation_angle parameter; (ix) defining a corner_image be equal to a block section of the upper-left corner of the rotated input image, said block section being of size equal to said common fixed size multiplied by said block_size multiplier; (x) storing the row index and column index of the best defined corner of a message block within said corner_image as a newRowID parameter and newColumnID parameter, respectively, and attributing a new_corner_confidence level to said best defined corner; (xi) IF the current_corner_confidence parameter is greater than the new_corner_confidence level, then returning to sub-step (vii), ELSE the current_corner_confidence parameter is set to equal to said new_corner_confidence level, said newRowID is stored in said best_corner_row_ID, said newColumnID is stored in said best_corner_column_ID, and said current_rotation_angle parameter is stored in said best_corner_rotation_angle parameter; (xii) IF no minimum_threshold_confidence level has been previously defined, THEN return to sub_step (v), ELSE IF the current corner confidence parameter is not greater than the minimum_threshold_confidence, THEN return to sub_step (v); (xiii) rotate and crop the input image to place the best message block corner at the upper-left corner of the input image as determined by parameters best_corner_row_ID, best_corner_column_ID, and best_corner_rotation_angle.

In this approach, prior to sub-step (i), the pre-processing sequence further includes providing skew-error compensation and removing white boarders from around the input image. Also in this approach, prior to sub-step (xii), the pre-processing sequence further includes defining a minimum_threshold_confidence level.

Also preferably, each of the message blocks has marker bits along its perimeter and logic data bits within its interior, and wherein sub-step (x) includes: generate a connected components mask of said corner_image; setting the new_corner_confidence level equal to 0; fining the marker bit patterns; setting newRowID equal to the row index of the row with maximum number of marker bits horizontally; defining a row_confidence as the number of marker bits in row newRowID divided by the sum of the number of marker bits and number of logic data bits in row newRowID; setting newColumnID equal the column index of the column with maximum number of marker bits vertically; defining a column_confidence as the number marker bits in column newColumnID divided by the sum of the number of marker bits and number of logic data bits in column newColumnID; setting new_corner_confidence level equal to the average of row_confidence and column_confidence.

In an alternate embodiment, the watermark code is arranged into a plurality of message blocks of a common fixed size and distributed over said input image, each of said message blocks having marker bits along its perimeter and data bits within its interior, and wherein said step (c) includes the following sub-steps: (1) dividing said binarized image into patches of size larger than, and proportional to, the size of a message block, and examining each patch in a predefined patch sequence; (2) IF the last patch has been examined then ending step (c); (3) selecting the next patch in the patch sequence as a current patch; (4) IF the orientation of the binarized image is in a known predefined orientation, then set a Patch_Rotation parameter to 360, ELSE set the Patch_Rotation parameter to 0; (5) converting the current patch into a derivative image that is thresholded to produce a binary image showing individual marker bit images and data bit images; (6) identifying the top-left corner of the derivative image; (7) examining the next bit image, IF the right-half of this current bit image can be identified as a logic 0 or a logic 1 data bit, THEN skipping to sub-step (8); ELSE IF the combined left-half and right-half of the current bit image together can be identified as a marker bit, THEN skipping to sub-step (8); ELSE assigning the current bit image a random value of logic-1 or logic-0 on a 50% probability basis; (8) storing the bit information of the current bit image; (9) IF all bit images have not yet been examined, then return to sub-step (7); (10) IF the Patch_Rotation parameter is greater than 270, THEN returning to sub-step (2), ELSE increment the Patch_Rotation parameter by a value of 90; (11) rotating the current patch by a number of degree equal to the Patch_Rotation parameter, and return to sub-step (6).

The present invention also provides a method of inserting watermark codes onto an input image, comprising: providing at least one mask block indicating regions of said input image upon which said watermark codes may be written; providing a message block containing said watermark codes; dividing said input image into at least one image block, where the number of image blocks corresponding to the number of mask blocks; assign a one-to-one relationship between said mask Blocks and corresponding image blocks; for each image block, applying the following steps: (I) using the current image block's corresponding mask block to create a mask-filtered block; (II) sub-dividing said mask-filtered block into "message-pattern-size" sub-blocks of equal size and dimension as a corresponding current message block, each message-pattern-size sub-block being divisible into a plurality of pattern image segments having a one-to-one correspondence with the watermark codes in its corresponding message block; (III) for each message-pattern-size sub-block: cycling through each watermark code in its corresponding message block, and: if the message-pattern-size sub-block indicates that the pattern image segment corresponding to the current watermark code is suitable for writing, then writing said watermark code within the image pattern image segment.

Preferably in step (III), if the message-pattern-size sub-block indicates that the pattern image segment corresponding to the current watermark code is not suitable for writing then determining if the watermark mark code is data bit or a marker bit, and if the watermark code is a data bit then not writing said watermark code within said image pattern segment, else if the watermark code is a marker bit then writing said watermark code within said image pattern segment irrespective of what the message-pattern-size sub-block indicates.

Further preferably, the intensity of the watermark code written within a corresponding image pattern image segment is made darker than its surrounding pixels if the average intensity of its surrounding pixels is not less than 255. Similarly, the intensity of the watermark code written within a corresponding image pattern image segment is made lighter than its surrounding pixels if the average intensity of its surrounding pixels is not more than 35.

It is further noted that the pattern image segments suitable for writing preferably correspond to background pixels in said input image, and pattern image segments not suitable for writing preferably correspond to foreground pixels in said input image.

The present invention also provides a method of extracting and deciphering a watermark code from an input image, comprising: applying a pre-processing sequence to said input image to at least assure that said watermark codes are readable in a pre-defined orientation beginning from a predefined corner of the input image's current orientation; converting said input image to a single channel digital image; generating a gradient image from said single channel digital image; defining a memory space hold an extracted_message; defining a lower intensity threshold and an upper intensity threshold, setting a current threshold equal to said lower intensity threshold; if said current intensity threshold is not greater than said upper intensity threshold, then repeating the following sub-steps, in sequence, until the current intensity threshold is greater than said upper intensity threshold: (a) increasing said current intensity threshold by a predefined, fixed amount; (b) binarizing said gradient image using said current intensity threshold to create a binarized image; (c) applying a message extraction routine to said binarized image and identifying the message extracted by the message extraction routine as a new_message; (d) if the new_message has a higher confidence of accuracy than the current contents in said memory space, then storing said new_message in said memory space; and defining the contents of said memory space as the deciphered watermark code.

Preferably, the generating of the gradient image from said single channel digital image uses the following relation: $\nabla I = \nabla Ix + \nabla Iy$.

Further preferably, the pre-processing sequence further crops said input image to remove any white boarder around said input image, and rotates said input image so that said watermark codes are readable from left-to-right and from top-to-bottom starting from the upper left corner of the cropped input image.

In an embodiment of the present invention, the watermark code is arranged into message blocks of a common fixed size and distributed over said input image, and wherein said pre-processing sequence includes the following sequential sub-steps: (i) setting a current_corner_confidence parameter equal to 0; (ii) setting a block_size multiplier equal to 1; (iii) defining a first memory space to store a best_corner_row_ID parameter, a second memory space to store a best_corner_column_ID parameter, and a third memory space to store a best_corner_rotation_angle parameter; (iv) defining a fixed series of rotation angles; (v) IF said block_size is less than a predefined value, THEN incrementing said block_size by a fixed increment value; ELSE skip to sub-step (xiii); (vi) setting a current_rotation_angle parameter equal to the first angle in said fixed series of rotation angles; (vii) IF the current_rotation_angle is equal to the last angle within said fixed series of rotation angles, THEN return to sub-step (v), ELSE IF the current_rotation_angle is not equal to the first angle within said fixed series of rotation angles THEN setting said current_rotation_angle parameter equal to the next angle in said fixed series of rotation angles; (viii) rotating said input image by said current_rotation_angle parameter; (ix) defining a corner_image be equal to a block section of the upper-left corner of the rotated input image, said block section being of size equal to said common fixed size multiplied by said block_size multiplier; (x) storing the row index and column index of the best defined corner of a message block within said corner_image as a newRowID parameter and newColumnID parameter, respectively, and attributing a new_corner_confidence level to said best defined corner; (xi) IF the current_corner_confidence parameter is greater than the new_corner_confidence level, then returning to sub-step (vii), ELSE the current_corner_confidence parameter is set to equal to said new_corner_confidence level, said newRowID is stored in said best_corner_row_ID, said newColumnID is stored in said best_corner_column_ID, and said current_rotation_angle parameter is stored in said best_corner_rotation_angle parameter; (xii) IF no minimum_threshold_confidence level has been previously defined, THEN return to sub_step (v), ELSE IF the current_corner_confidence parameter is not greater than the minimum_threshold_confidence, THEN return to sub_step (v); (xiii) rotate and crop the input image to place the best message block corner at the upper-left corner of the input image as determined by parameters best_corner_row_ID, best_corner_column_ID, and best_corner_rotation_angle;

Preferably prior to sub-step (i), said pre-processing sequence further includes providing skew-error compensation and removing white boarders from around the input image.

Also preferably prior to sub-step (xii), said pre-processing sequence further includes defining a minimum_threshold_confidence level.

Additionally, it is presently preferred that each of said message blocks has marker bits along its perimeter and logic data bits within its interior, and wherein sub-step (x) includes: generate a connected components mask of said corner_image; setting the new_corner_confidence level equal to 0; fining the marker bit patterns; setting newRowID equal to the row index of the row with maximum number of marker bits horizontally; defining a row_confidence as the number of marker bits in row newRowID divided by the sum of the number of marker bits and number of logic data bits in row newRowID; setting newColumnID equal the column index of the column with maximum number of marker bits vertically; defining a column_confidence as the number marker bits in column newColumnID divided by the sum of the number of marker bits and number of logic data bits in column newColumnID; setting new_corner_confidence level equal to the average of row_confidence and column_confidence.

Further preferably, the watermark code is arranged into a plurality of message blocks of a common fixed size and distributed over said input image, each of said message blocks having marker bits along its perimeter and data bits within its interior, and wherein said step (c) includes the following sub-steps: (1) dividing said binarized image into patches of size larger than, and proportional to, the size of a message block, and examining each patch in a predefined patch sequence; (2) IF the last patch has been examined then ending step (c); (3) selecting the next patch in the patch sequence as a current patch; (4) IF the orientation of the binarized image is in a known predefined orientation, then set a Patch_Rotation parameter to 360, ELSE set the Patch_Rotation parameter to 0; (5) converting the current patch into a derivative image that is thresholded to produce a binary image showing individual marker bit images and data bit images; (6) identifying the top-left corner of the derivative image; (7) examining the next bit image, IF the right-half of this current bit image can be identified as a logic 0 or a logic 1 data bit, THEN skipping to sub-step (8); ELSE IF the combined left-half and right-half of the current bit image together can be identified as a marker bit, THEN skipping to sub-step (8); ELSE assigning the current bit image a random value of logic-1 or logic-0 on a 50% probability basis: (8) storing the bit information of the current bit image; (9) IF all bit images have not yet been examined, then return to sub-step (7); (10) IF the Patch_Rotation parameter is greater than 270, THEN returning to sub-step (2), ELSE increment the Patch_Rotation parameter by a value of 90; (11) rotating the current patch by a number of degree equal to the Patch_Rotation parameter, and return to sub-step (6).

In an additional embodiment of the present invention, in step (d), the confidence of accuracy is determined by comparing the characters in the currently created message with characters identified in previous cycles and determined the most probably character string by comparing the frequency of occurrence of each character in the character string in its particular location within the character string.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 4b shows the binarized bit image after application of a fill-in operation to fill in the interior and border areas defined by the skeleton pattern of FIG. 4a.

FIG. 14b re-presents the image of FIG. 14a.

FIG. 26 illustrates the result of applying the pre-processing process of FIGS. 18-25 to page 151 of FIG. 17.

DESCRIPTION OF THE PREFERRED EMBODIMENTS

Figure 1:
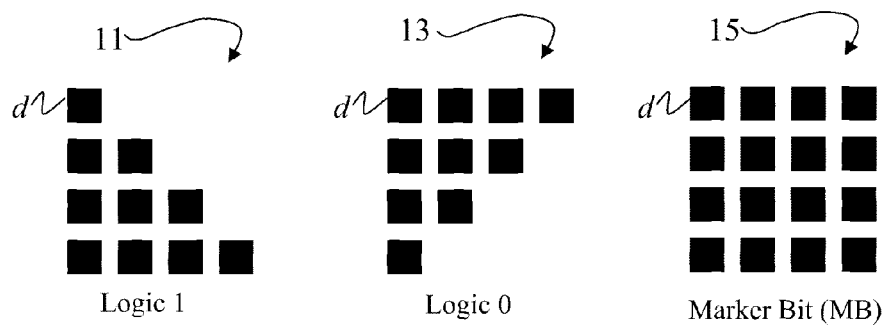
FIG. 1 shows three distinct bit-pattern symbols to represent a logic-1 data bit, a logic-0 data bit and a marker bit (MB), respectively, in accord with the present invention.

Before going into the details of the present invention, an exemplary bit-encoding scheme is presented. It is to be understood that multiple bit-encoding schemes are known in the art, and selection of a specific bit-encoding scheme is not critical to the present invention.

A user-provided message string is first converted into a suitable form by bit-encoding. The user-provided message string may be any character string, which for illustration purposes is herein assumed to be character string: "Hello world". This text character string (i.e. message string) is then re-rendered as (i.e. encoded into) a collection of logic low "0" bits and logic high "1" bits. In this encoding operation, every unique character in the message string is correlated to a corresponding unique numeric code, preferably in the range from 0 to 255. Each numeric code, in turn, represents a unique group of data bits, such as a byte (an 8-bit binary number). This may be achieved by converting the text characters in the user-provided message string into their ASCII code equivalent. As it is known in the art, ASCII code is the American Standard Code for Information Interchange, and it provides a character-encoding scheme for converting text characters into machine readable, binary codes of eight bits each. For the present exemplary message string of "Hello world", the ASCII equivalent numeric codes for each text character are shown in Table 1 below.

TABLE 1

| Text Character | ASCII Code | Binary Code |
| --- | --- | --- |
| H | 72 | 01001000 |
| e | 101 | 01100101 |
| l | 108 | 01101100 |
| l | 108 | 01101100 |
| o | 111 | 01101111 |
|   | 32 | 00100000 |
| w | 119 | 01110111 |
| o | 111 | 01101111 |
| r | 114 | 01110010 |
| l | 108 | 01101100 |
| d | 100 | 01100100 |

The "Hello world" message string can therefore be represented as the following binary bit-vector:
 0100100001100101011011
 00011011000110111110010
 00000111011101101111101
 1100100110110001100100
Since the message is now a collection of logic 0's and 1's, all that is needed is a way to represent a logic-0 and a logic-1 on a printed image. The representation of logic 0's and 1's is an important aspect of the present invention.

A novel, and printable, pattern symbol design (or bit-pattern design) for representing a 0-bit and a 1-bit for use in visible image watermarking is described below. Before describing the presently preferred bit-pattern symbol designs, however, it is beneficial to first define a "full-length message string" since it is currently preferred that user-provided message strings be formatted into a full-length message string prior to being watermarked (i.e. encoded) onto an input image. It is to be understood that the defined length of the "full-length message string" is a design choice.

It is presently preferred that all message strings that are to be encoded onto an input image be of equal length, and preferably be confined to a fix length of 64 bytes (or 64 one-byte characters) in total, which defines the "full-length message string". Smaller message strings may be padded with known bit-data to make their final bit-length equal to 64 bytes. For instance, the present exemplary message string, "Hello world", which consists of only 11 characters, may be rewritten as "Hello world" with multiple blank spaces appended at its end. In other words, 53 blank-space characters may be appended to the end of the original, 11-character "Hello world" message string to make it a full-length message string of 64 characters. Once the bit data representation of the full-length message string is obtained, a bit-pattern symbol design is necessary.

With reference to FIG. 1, the presently preferred embodiment uses three distinct bit-pattern symbols 11, 13, and 15 to represent a logic-1 bit, a logic-0 bit and a marker bit (MB), respectively. Each of bit-pattern symbols 11, 13, and 15 consists of a specific arrangement of individual dots (or squares) d. More specifically, bit-pattern symbol 11 arranges ten dots d in a triangular arrangement with four dots d at its base. Bit-pattern symbol 13 likewise arranges ten dots d in a triangular arrangement with four dots d at its base; wherein bit-pattern symbol 13 resembles bit-pattern symbol 11 rotated ninety degrees clockwise. By contrast, bit-pattern 15 arranges sixteen dots d in a 4×4 square grid arrangement, with four dots d at its side.

Figure 2:
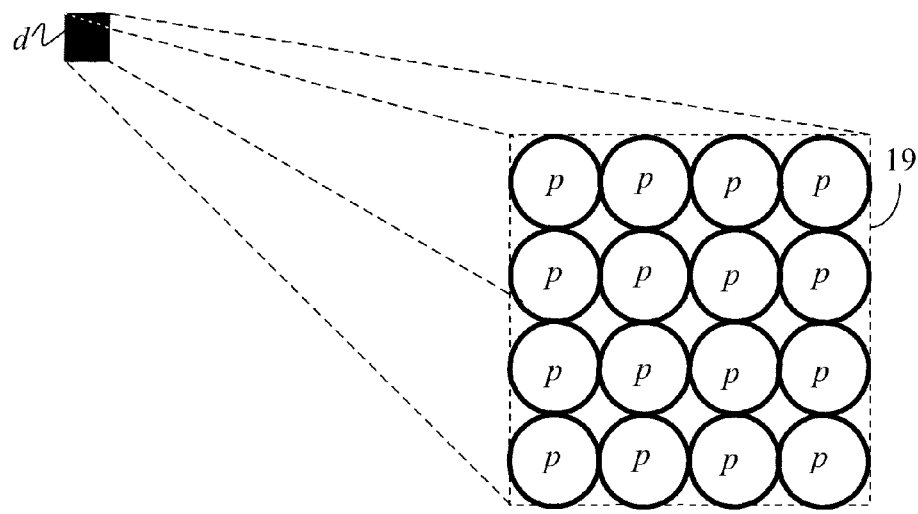
FIG. 2 shows that each dot d in FIG. 1 preferably consists of sixteen pixels p in a 4×4 grid arrangement.

As is shown in FIG. 2, each dot d preferably consists of sixteen pixels p in a 4×4 grid arrangement 19. Thus, each dot d preferably has a pixel arrangement matching the dot arrangement of each marker bit.

Bit-pattern symbols 11, 13, and 15 have not been previously used in industry, and were developed to address a number of specific real-world problems.

Firstly, it has been found that the 4×4 grid arrangement 19 of sixteen pixels p per dot d may be printed and scanned more consistently across a wide array of commercial and consumer level printers and scanners. Secondly, the presently preferred bit-pattern symbols 11, 13, and 15 permit the use of simple horizontal and vertical projection-profiles as part of bit recognition techniques, as is explained more fully below. Thirdly, the introduction of marker bit 15 for use as a placeholder to demarcate boundaries of a message string (or message block, as defined below) facilitates a decoding procedure.

The arrangement of bit-pattern symbols 11, 13, and 15 that represent an input message string may be overlaid on the entire input image, irrespective of the input image's foreground or background pixels. Color selection of each bit-pattern symbol 11, 13, and 15, however, is preferably adaptively changed so that bright regions of the input image have darker bit-pattern symbols overlaid on them, and dark regions of the input image have lighter bit-pattern symbols overlaid on them.

An important characteristic of the present bit-pattern symbols is that after a print-and-scan cycle, the bit-pattern symbols appear as continuous objects rather than as a collection of dots d. That is, the print-and-scan cycle tends to blur bit-pattern symbols 11, 13, and 15 such that it becomes more difficult to differentiate between individual dots d, and instead what is discernable is the general contiguous shape of bit-pattern symbols 11, 13, and 15, as defined by the arrangement of the collection of dots d. It has been further found that accurate detection of the bit-pattern symbols 11, 13, and 15 is not affected by rotation of a watermarked image, under the presently preferred use of projection profiles to detect bit-pattern symbols, as is described below.

Once the bit-pattern symbols are overlaid on the input image (or input document), the input image may undergo a print-and-scan cycle. One of the primary effects of this print-and-scan cycle is due to the lower dynamic range of a scanned document. Colors seem to get closer to each other and sharp edges often get blurred. Consequently, actual intensity values extracted from a scanned image may not be optimal indicators for use in identifying bit-pattern symbols.

Therefore, the present invention makes use of a gradient based technique to identify bit-pattern symbols in a scanned image. The presently preferred gradient based technique computes and combines horizontal and vertical gradients.

Figure 3:
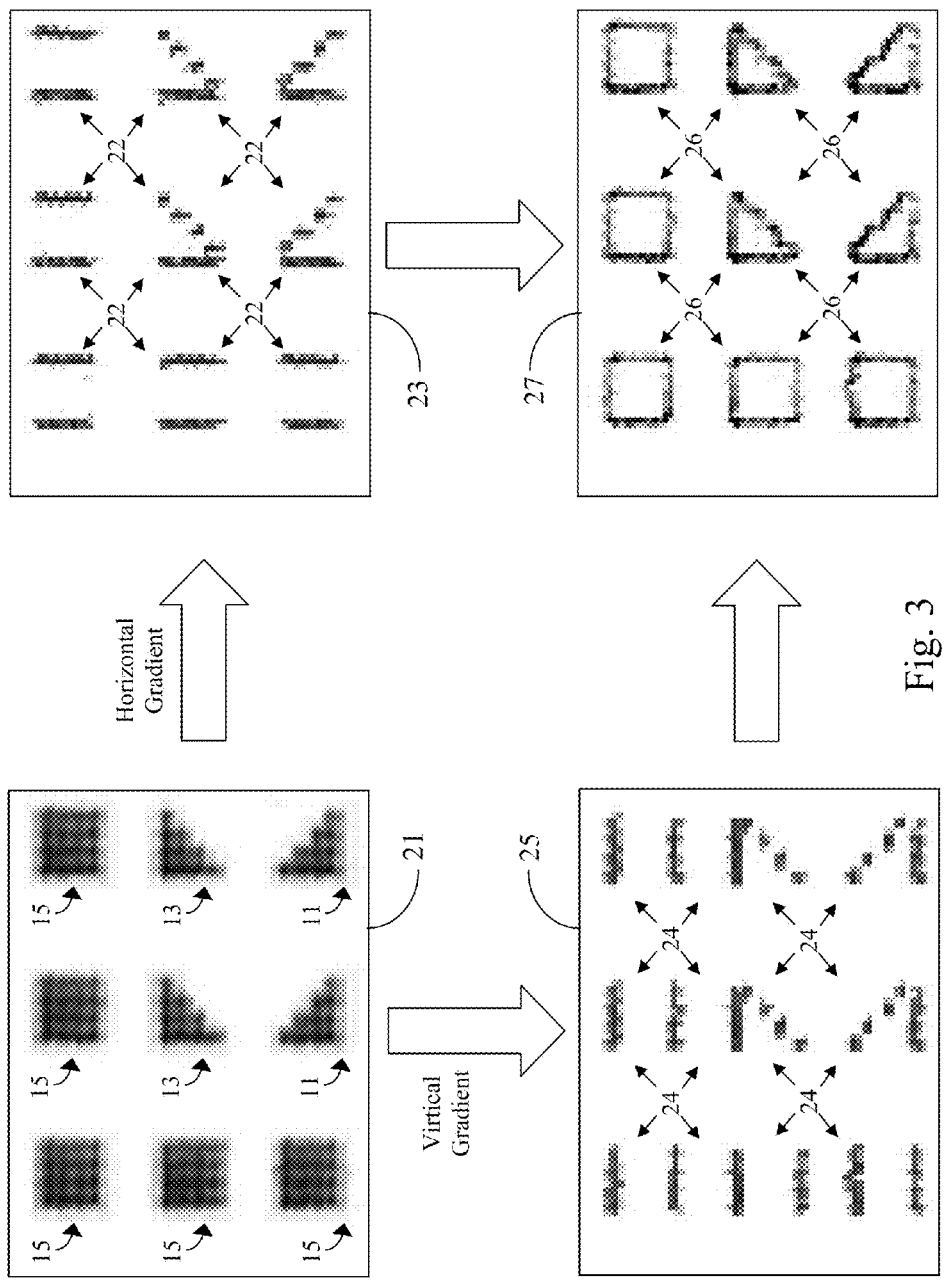
FIG. 3 shows multiple processing phases in a process for discerning the general shape of each bit-pattern symbols in an input image.

FIG. 3 shows a representation of an input image 21 generated by scanning a printed document having nine bit-pattern symbols (i.e. nine representations of bit-pattern symbols 11, 13, and 15), with each bit-pattern symbol being in accord with the present invention. Also shown are multiple processing phases (23, 25, and 27) in a process for discerning the general shape of each of the nine bit-pattern symbols in input image 21.

First, a horizontal gradient image 23 and a vertical gradient image 25 are created. Horizontal gradient image 23 is an absolute intensity image of a horizontal gradient, or derivative, of input image 21, and detects the edges of the bit-pattern symbols in input image 21 along its horizontal direction. That is, the horizontal gradient determines an intensity difference between adjacent pixels in a horizontal direction in input image 21, and thus is effective for identifying boundaries between light and dark regions, as encountered when traversing rows of pixels across input image 21 in the horizontal direction. For example, the difference in intensity value between adjacent pixels within the white areas separating bit-pattern symbols 11, 13, and 15 within scanned image 21 is zero, and thus these regions would typically have an intensity gradient value of zero (i.e. be dark) in the resultant horizontal gradient image 23. However, for ease of illustration, regions of input image 21 having small gradient differences in intensity values are indicated as light areas in horizontal gradient image 23 rather than as dark areas. Similarly for illustration purposes, regions of input scanned image 21 having large gradient differences in intensity values are indicated as dark areas in horizontal gradient image 23. In input scanned image 21, the intensity difference between adjacent pixels when moving along a horizontal direction is highest when leaving a white region and entering the beginning of a bit-pattern symbol, or when leaving a bit-pattern symbol and entering the beginning of a white region. Therefore, these left-side and right-side boundary lines of the bit-pattern symbols of input image 21 manifest themselves as dark vertical or diagonal linear arrangements 22 in horizontal gradient image 23.

As is explained above, each the bit-pattern symbol is comprised of a group of adjacent dots d separated by a blank small spaces. The blank spaces between adjacent dots d may manifest themselves as light areas in a scanned image, such as input image 21. But desired vertical or diagonal linear arrangements 22 (or 24) may be identified by looking for connected components of minimum size within a gradient image 23 (or 25). Preferably, the minimum size is about 75% of the area of a marker bit. The end-result is that horizontal gradient image 23 identifies the horizontal left and right boundaries, or borders, of bit-pattern symbols within input image 21.

A similar approach is taken to determine a vertical gradient of input image 21. Vertical gradient image 25 shows the absolute intensity image of a vertical gradient (i.e. vertical derivative) of scanned image 21. In this case, a change in light intensity when moving vertically along columns of pixels in input image 21 are encountered when moving into, or out of, a bit-pattern symbol. Thus, the horizontal and diagonal linear regions 24 in vertical gradient image 25 indicate the top and bottom boundaries of the bit-pattern symbols 11, 13, 15 of input image 21.

Finally, the horizontal gradient image 23 and the vertical gradient image 25 are combined to form outline image 27. The result of this combination is a set of nine skeleton patterns (i.e. outlines) 26 of the nine scanned bit-pattern symbols of input image 21. As is clear from outline image 27, the present approach facilitates the reliable reproducing, i.e. identifying, of bit-pattern symbols 11, 13, and 15 as scanned in input image 21.

Once the individual skeleton patterns 26 have been generated, as shown in outline image 27, a fill-in operation is performed on skeleton patterns 26, which converts the skeleton patterns into pattern blocks that represent the original bit-pattern symbols 11, 13, and 15 of input image 21.

Figure 4A:
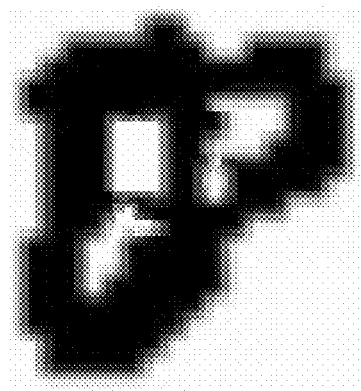
FIG. 4a shows a binarized bit image of a recovered skeleton pattern (i.e. outline) of a bit-pattern symbol.
Figure 4B:
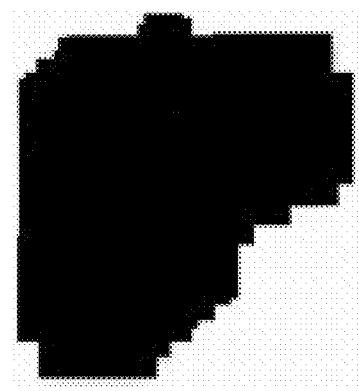

For example, FIG. 4a shows a binarized bit image of a recovered skeleton pattern (i.e. outline) of bit-pattern symbol 13. FIG. 4b shows the binarized bit image after application of the fill-in operation to fill in the interior and border areas defined by the skeleton pattern, which recovers bit-pattern symbol 13.

Having recovered the encoded, bit-pattern symbols, the next step is reading the bit-pattern symbols (i.e. identifying the bit data information represented by bit-pattern symbols 11, 13, and 15). The presently preferred embodiment for reading bit-pattern symbols uses a projection profile technique to identify the logic bit values represented by each pattern symbol shape.

Figure 4C:
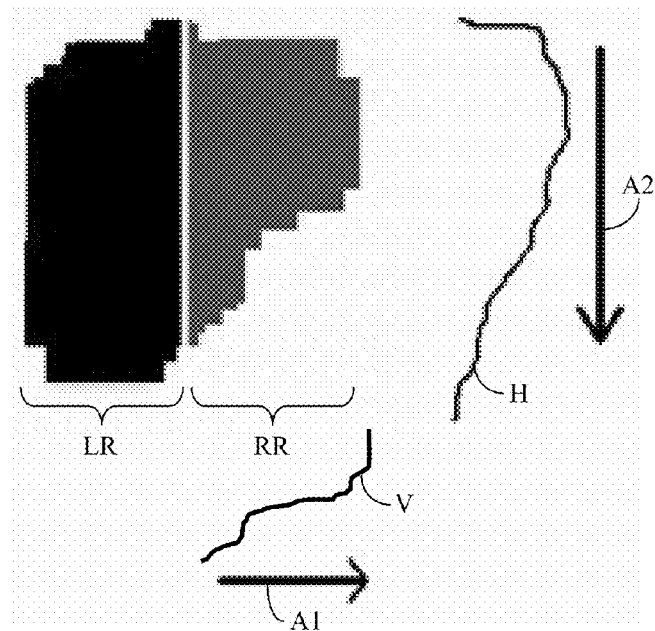
FIG. 4c shows the dividing down the middle of the filled-in image of FIG. 4b in preparation for extracting bit pattern information.

As is shown in FIG. 4c, a filled-in image of a pattern symbol is first divided vertically approximately down the middle to form a left region LR and a right region RR, whose widths are approximately the same. A horizontal projection profile H and a vertical projection profile V are then determined for the right region RR. The horizontal projection profile H is determined by moving down the rows of pixels within the right region RR, and counting the number of pixels that are part of right region RR within each row. If plotted, the pixel distribution across the rows would form a contour line for horizontal projection H. The vertical projection V is determined by moving along the columns of pixels within the right region RR, and counting the number of pixels within each column of RR. A plot of vertical projection V is shown for illustration purposes. Thus, the vertical V and horizontal H projections are in essence row and column histograms of the pixels that make up right region RR.

By moving along the histogram in the direction of the shown arrows, and noting the difference in the number of pixels in each row (or column), one can determine both the direction and magnitude of a change. For example, when moving along vertical projection V along arrow A1, a positive or negative change would indicate an upward or downward change in direction along vertical projection V, and the size of the change would provide an indication of the magnitude of the change, or slope. Similarly, when moving along horizontal projection H along arrow A2, a positive or negative change would indicate a rightward or leftward change in direction along horizontal projection H, and the size of the change would provide an indication of the magnitude of the change.

Preferably, if the change in direction along a first predefined span of the horizontal projection H (i.e. the horizontal profile) is greater than a first threshold and the change in direction along a second predefined span the vertical projection V (i.e. the vertical profile) is greater than a second threshold, then the recovered pattern symbol is determined to be a data bit. Preferably, the first and second predefined spans are at least a third of the span of the horizontal projection H and vertical projection V, respectively. Additionally, by combining the change (and magnitude) in direction the horizontal projection and the vertical projection, one can identify a data bit as a logic 0 or a logic 1, as summarized in the following table.

| Horizontal Projection | Vertical Projection | Inference |
|---|---|---|
| <0 | <−0.2 | Logic 0 |
| ≧0 | <−0.2 | Logic 1 |

For example, the pattern symbol of FIGS. 4a-4c represents a logic-0 bit (i.e. pattern symbol 13 in FIG. 1). Therefore, as is indicated in FIG. 4c, the vertical projection profile V of right region RR decreases from left to right along arrow A1. Stated differently, the vertical pixel-length (i.e. pixel count) of pixel columns within right region RR is reduced as one progresses from left to right within right region RR. Similarly, the horizontal projection profile H (i.e. the pixel-length of adjacent horizontal lines of pixels within right region RR) decreases as one progresses from top to bottom along arrow A2. Since the direction and length-change of the vertical and horizontal projections is greater than their respective predefined first and second thresholds, the recovered pattern symbol of FIG. 4c is correctly determined to be a data bit, rather than a marker bit MB. Additionally, since the vertical projection decreases from left to right, and the horizontal projection decreases from top to bottom, the pattern symbol is further correctly identified as a logic-0 bit.

Alternatively, if the vertical projection had decreased from left to right, but the horizontal projection had increased from top to bottom, then the pattern symbol would have been identified as a logic-1 bit. This is better illustrated in FIG. 5, below.

Figure 5:
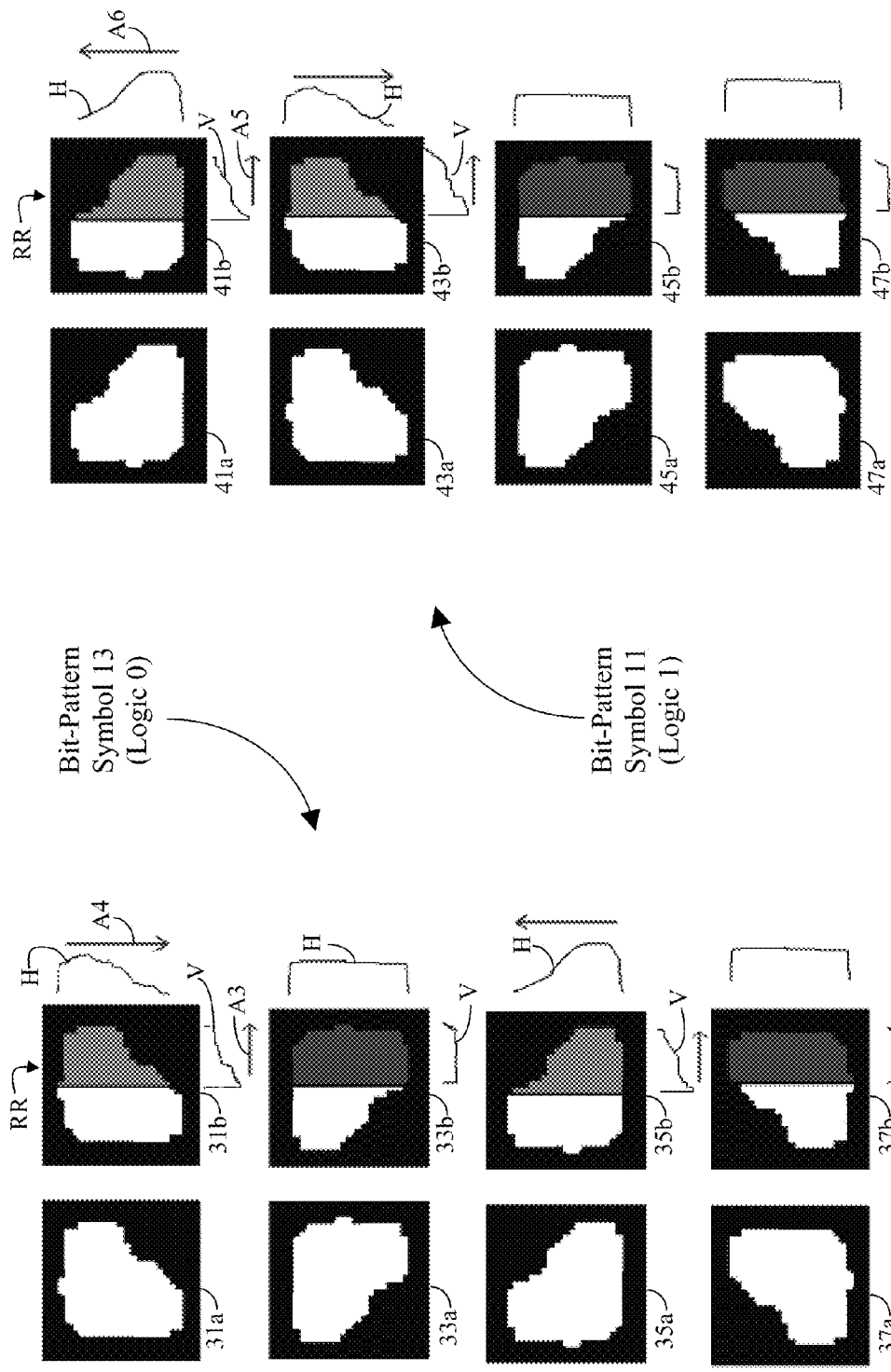
FIG. 5 shows the application of the presently preferred bit extraction technique applied to a logic 0 bit pattern and a logic 1 bit pattern as each bit pattern is rotated at 90° intervals.

Another important feature of the present invention is that if an image scan of a document is rotated, only the original, correct orientation of the document will render correct data. For example, the left side of FIG. 5 shows four rotations of pattern symbol 13. The four rotations of pattern symbol 13 are arranged as four pairs, 31a/31b through 37a/37b.

Within each pair, the left-side pattern symbol (31a-37a) shows the initial state of a recovered symbol after application of the fill-in process, as is described above in reference to FIG. 4b. Also within each of pair 31a/31b through 37a/37b, the right-side symbol 31b-37b shows the identification of its respective right region RR (shown as a shaded area) in preparation for reading the symbol, as is explained above in reference to FIG. 4c.

Pattern symbol 31a shows a correctly orientated pattern symbol representing a logic-0 bit. Pattern symbol 31b shows the reading of this pattern symbol by identifying its right-region RR, and determining its respective vertical projection V and horizontal projection H. In the present case, the vertical projection V of pattern symbol 31b decreases from left-to-right along the direction arrow A3, which identifies it as a logic bit as opposed to a marker bit. Additionally, the horizontal projection H of pattern symbol 31b decrease from top-to-bottom along the direction of arrow A4, which identifies it a logic-0 bit. If horizontal projection H of pattern symbol 31b increased from top-to-bottom, then it would have been identified as a logic-1 bit. Thus, since vertical projection V decreases from left-to-right and horizontal projection H decreases from top-to-bottom, pattern symbol 31b is correctly identified as representing a logic-0 bit.

If pattern symbol 31a were rotated 90 degrees clockwise as indicated by pattern symbol pair 33a/33b, then the right-region RR of pattern symbol 33b would be rectangular. In this case, its vertical projection V would have a relatively flat bottom and its horizontal projection H would also have a relatively flat side. Consequently, both the vertical V and horizontal H projections would manifest changes (from column-to-column and from row-to-row) of less than the prescribed thresholds, and the pattern would be erroneously identified as a marker bit.

If original pattern symbol 31a were rotated still another 90 degrees counterclockwise as shown in pattern symbol pair 35a/35b, then its right-region RR would be as shown in pattern symbol 35b. In this case, its respective vertical projection V would decreases from left-to-right indicating that it is a data bit, and not a marker bit. However, its horizontal projection H would increase from top to bottom (or equivalently, it would decrease from bottom-to-top). Pattern symbol 35b would therefore be erroneously identified as representing a logic-1 bit.

If original pattern symbol 31a were rotated 180 degrees clockwise as shown in pattern symbol pair 37a/37b, then its right-region RR would be as shown in pattern symbol 37b. Again, the resultant shape of the vertical and horizontal projections of its respective right-region RR would appear relatively flat, and pattern symbol 37b would again be erroneously identified as a marker bit.

Thus, the pattern symbol representing a logic-0 bit is correctly identifiable only when it is read in its correct orientation.

Similar results are obtained if a logic-1 pattern symbol is rotated, as is shown in pattern symbol pairs 41a/41b through 47a/47b on the right side of FIG. 5. Pattern symbol 41a shows a correctly orientated image of a pattern symbol 11 representing a logic-1 bit, pattern symbol 41b shows the identification of its right-region RR in preparation for reading the pattern symbol by identifying its vertical projection V and its horizontal projection H. In the present case, its vertical projection V decreases from left-to-right along arrow A5, but its horizontal projection H decreases from bottom-to-top along arrow A6. Pattern symbol 41b would therefore be correctly identified as representing a logic-1 bit.

If the original symbol 41a were rotated 90 degrees clockwise as is shown in pattern symbol pair 43a/43b, then the right-region RR would be tapered, as shown in pattern symbol 43b. In this case, the vertical projection V would decrease from left-to-right indicating that it is a logic bit, but the horizontal projection H would decrease from top-to-bottom erroneously identifying it as a logic-0 bit.

If the pattern symbol 43a were then rotated another 90 degrees as indicated by pattern symbol pair 45a/45b, then the right-region RR would be rectangular. In this case, the vertical V and horizontal H projections would show changes of less than the prescribed thresholds and the pattern would be erroneously identified as a marker bit.

If pattern symbol 45a were rotated another 90 degrees clockwise as indicated by pattern symbol pairs 47a/47b, then its right-region RR would again be rectangular. Thus, pattern symbol 47b would again be erroneously identified as a marker bit.

Both in preparation for message encoding and for message extraction, a connected components mask (i.e. a binary mask) is created. For message encoding, a first connected component mask of the input image upon which the watermark message is to be written is created. For message extraction, a second connected component mask of a scanned image (or the image from which a watermark message is to be extracted) is created. The basic difference between the first and second connected component mask is an area threshold parameter that determines the size of the connected components.

Figure 7A:
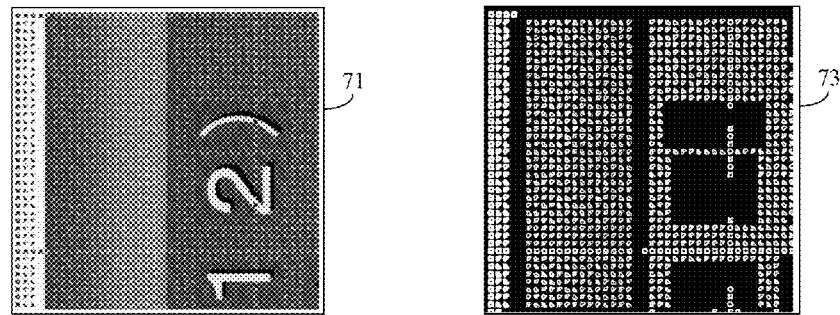
FIG. 7a shows the application of the connected components mask method of FIG. 6 to an image to remove everything except the pattern symbols, which are shown as white image patterns on a black background.
Figure 7B:
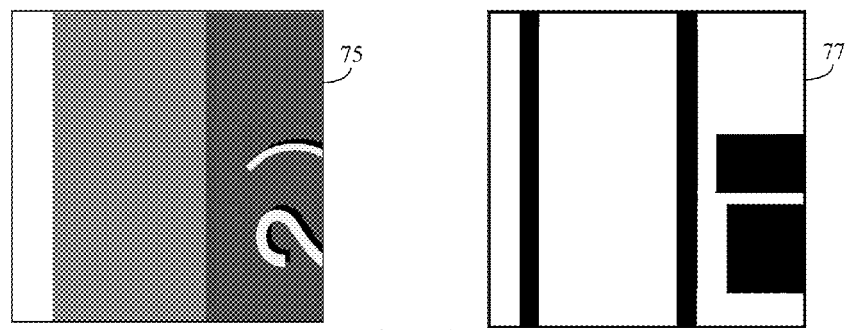
FIG. 7b shows the result of applying the connected component mask process of FIG. 6 to an image that did have a watermarked message.

With reference to FIG. 7b, image 75 shows a partial view of an input image upon which a watermark message is to be written. The objecting in creating the first connected component is to identify those areas within input image 75 where the watermark message may be written. In the present example, image 77 is the resultant first connected component mask, which shows in white those areas where the watermark message may be written, and shows in black those areas where the watermark mark should not be written.

Image 71 in FIG. 7a shows an example of a watermark message written upon input image 75 according to first connected component mask 77. In order to extract the watermark message from image 71, a second connected component mask is created that identifies areas (i.e. bit images) of input image 71 that contain marker bit or data bit information within image 71. In the present example, second connected component 73 identifies these bit images that should be read as white areas in a black field. Message extraction is explained in more detail below.

Figure 6:
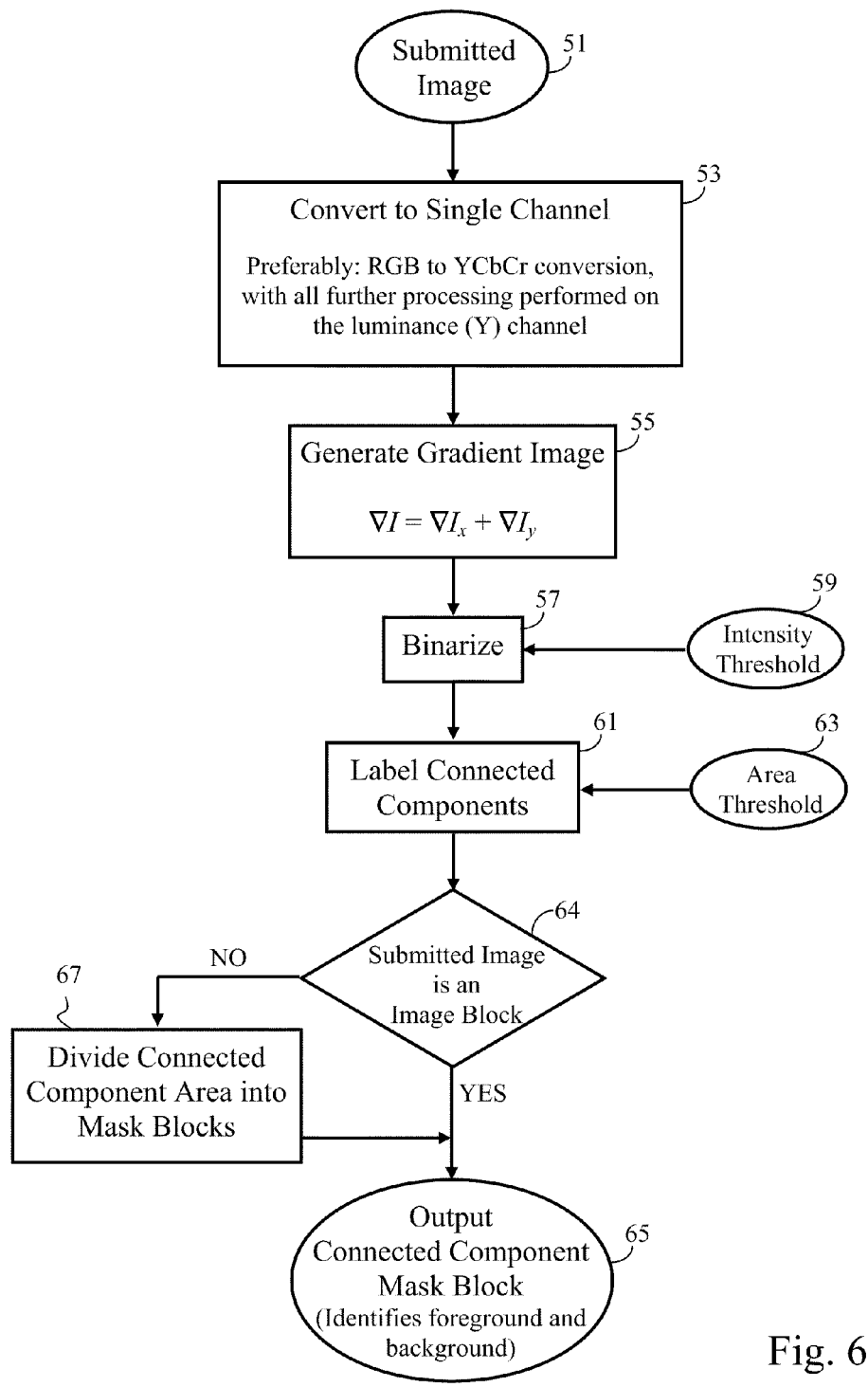
FIG. 6 shows a preferred method of creating a connected components mask.

A general process for construction of a connected component mask (for either the first or second connected component mask) is shown in FIG. 6. To create the connected components mask, a submitted image 51 is first converted to a single channel image (step 53). It is to be understood that submitted image 51 may be the input image, in its entirety. Alternatively, the input image may be divided into multiple image blocks, and each image block may be processed individually as the submitted image in step 51. In one embodiment of the present invention, an entire image is submitted for message encoding, and multiple image blocks are submitted for message extraction, but this a design choice.

If separate image blocks are submitted individually, such that process steps 51-63 are separately applied to each image block (step 64=YES), then the output mask at step 65 would be a mask block of size equal to the image block. Alternatively, if the submitted image 51 is the whole input image, in its entirety, such that steps 51-63 are applied to the entire input image (step 64=NO), then the resultant connected component area mask may be divided into mask blocks of size equal to an image block (step 67) prior to outputting the result at step 65.

The conversion to a single channel image at step 53 may be achieved by applying an RGB to YCbCr conversion to image 51, and then performing all further processing only on the luminance (Y) channel. A light intensity gradient image of the luminance channel image (i.e. intensity I) is then the generated (55) using the following relationship:

$$\nabla I = \nabla I_x + \nabla I_y$$

Next, a binarized image of the light intensity gradient image is created (57) by comparing each intensity value to a single intensity threshold 59. Connected components of binarized image are then labeled (61). An area mask (i.e. binary mask) can then be created (65) by discarding all connected components whose sizes vary more than ±25% of an area threshold 63. The size of area threshold 63 depends on whether one is creating a first connected component mask for message insertion (i.e. writing) or a second connected component for message extraction (i.e. reading). For message insertion, area threshold 63 defines an area for inserting a watermark message, and in one embodiment, generally separates the foreground from the background of the image. For message extraction, area threshold 63 is much smaller, and preferably of similar size as the area of a pattern bit.

If the image has not yet been watermarked, then the watermark message, as encoded, is overlaid (i.e., printed) using the above described pattern symbols 11, 13, and 15. Identification of the background and foreground sections of the input image is advantages for applying optional printing variations. For example, in a preferred embodiment, data bit patterns are printed solely on background sections of the input image, but marker bit patterns are printed on both foreground and background sections of the input image. As it explained more fully below, the data bit patterns and marker bit patterns are varied in intensity depending on the general intensity of their surrounding image pixels. That is, bit patterns are printed darker than their surrounding image bits in areas where the input image is light (i.e. above a predefined intensity threshold), and bit patterns are printed lighter than their surrounding image in areas where the input image is dark (i.e. not above the predefined intensity threshold).

Conversely, if the image is a previously watermarked image (such as a scan image of a previously printed watermarked image), then the area mask (i.e. mask block) will highlight (i.e. create pattern images of) the pattern symbols for ease of extraction and decoding.

In either case, providing different thresholds for luminance intensity and connected component area results in the final area mask looking quite different from the originally submitted image from step 51, as is explained above in reference to FIGS. 7a and 7b.

Before continuing with the present discussion of encoding a watermark message into an image or extracting a watermark message from a watermarked image, it is beneficial to first address two points of interest. First, a potential problem that may arise during generation of an input image should be addressed, and secondly one should consider any preferred formatting of a user-provided message string prior to encoding the message string as a watermark message.

Firstly, the potential problem that may arise during generation of the input image is most commonly associated with a problem arising from a scanning operation. It is be understood that a printed image on paper may be scanned to create an electronic image onto which a watermark message may to be encoded, or a previously encoded, watermarked image may be scanned in preparation for extracting the encoded watermark message.

The potential problem being addressed here may be termed "skew error", and it arises when an original image is not placed in perfect alignment with the edges of a scanner platen during a scanning operation. Skew error is basically a small rotation error in the electronic image caused when the original paper image was askew while being scanned.

Figure 8:
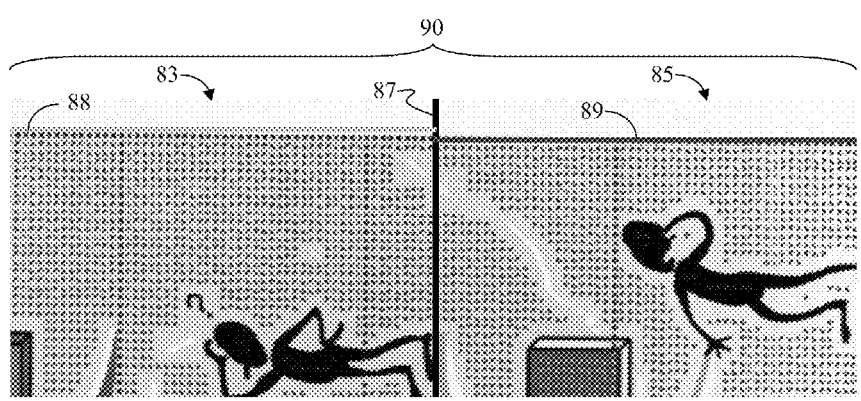
FIG. 8 illustrates an example of rotation error, or skew error.
Figure 9:
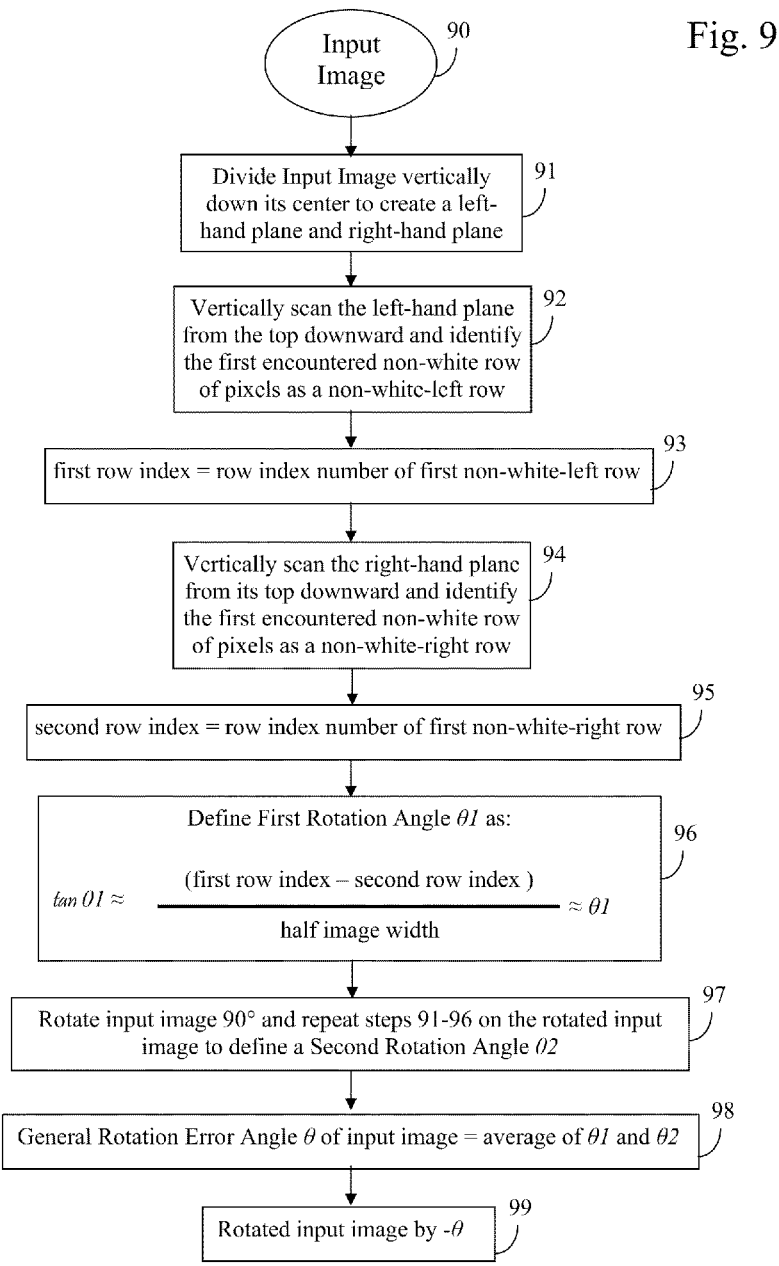
FIG. 9 is a preferred method of correcting for skew error illustrated in FIG. 8.

An example of this type of rotation error, or skew error, is illustrated in FIG. 8, and a preferred method for correcting for skew error is illustrated in FIG. 9. Preferably, one begins by first dividing the input image 90 (i.e. a scanned image in the present example of FIG. 8) into a left-hand plane 83 and a right-hand plane 85 with a vertical divide (or cut) 87 separating the left-hand plane 83 from the right-hand plane 85 (step 91). Preferably, the vertical divide 87 is along the center of the input image 81 such that the left-hand plane 83 spans a left half of the input image 81 and the right-hand plane 85 spans a right half of the input image 81.

Next, the left-hand plane 85 is searched (i.e. scanned vertically downward from top-to-bottom) to identify the first non-white row (i.e. non-blank row) of pixels (step 92). This first non-white row is hereafter identified as the first non-white-left row and is indicated by dash line 88 in FIG. 8. Basically, this search identifies the first such non-white row encountered when searching from the top of the left-hand plane towards the bottom of the left-hand plane, and designates the encountered row as the first non-white-left row. The row index number of this first non-white-left row may be identified as a first row index (step 93). Similarly, the right-hand plane 85 is searched to identify its first non-white-right row of pixels when searching vertically from its top towards its bottom (step 94), and a second row index corresponding to the first non-white-right row 89 is recorded (step 95).

In the presently preferred embodiment, a non-white row is characterized as row having a luminance intensity histogram containing less than a pre-specified percentage of white pixels (preferably less than 98 percent). In other words, the percentage of white pixels (i.e. pixels having a luminance intensity greater than 250) in a non-white row is less than 98 percent of the total pixels in the same row.

The vertical spatial difference between the estimated first non-white-left row and the first non-white-right row may be used as a metric to determine image rotation. Basically, the difference between the first row index and second row index is a measure of the vertical offset from the first non-white-left row to the first non-white-right row. The width of the left-hand plane may then be used in combination with the vertical offset to obtain a first estimate the rotation angle θ1. Furthermore, since the left-hand plane and right-hand plane preferably have similar widths, the width of the left-hand plane may be estimated as half the width of the input image. Consequently, an estimate of a first rotation angle θ1 may be obtained as shown in step 96 as, $$\text{rotation angle } \theta 1 \approx \tan\theta 1 \approx \left( \frac{(\text{first non-white-left row}) - (\text{first non-white-right row})}{\text{half image width}} \right)$$

Preferably, the input image 90 is then rotated ninety degrees, and this same procedure for estimating rotation angle is repeated on the rotated, input image (step 97) to obtain an estimate of a second rotation angle θ2 for the rotated input image. As is indicated in step 98, the two estimated rotation angles θ1 and θ2 may then be averaged together to obtain an estimate of the general rotation error angle θ of input image 90 (i.e. the skew error of input image 90). Note that the image is preferably converted to a single channel image (RGB to YCbCr), and then work with the Y channel only. The converted image is further smoothed and binarized to handle noise. Skew angle may be corrected by countering the estimated general rotation error angle θ of input image 90 (step 99). That is, input image 90 may be rotated by minus the rotation error angle (i.e. by −θ).

Having discussed the first point of interest (i.e. the detection and correction of skew error), the second point of interest to be discussed prior to presenting an encoding process is the issue of applying a preferred formatting scheme to a user-provided, message string prior to encoding as a watermark message. The presently preferred formatting scheme has been found to provide benefits in facilitating the recovery of encoded watermarked messages.

Figure 10:
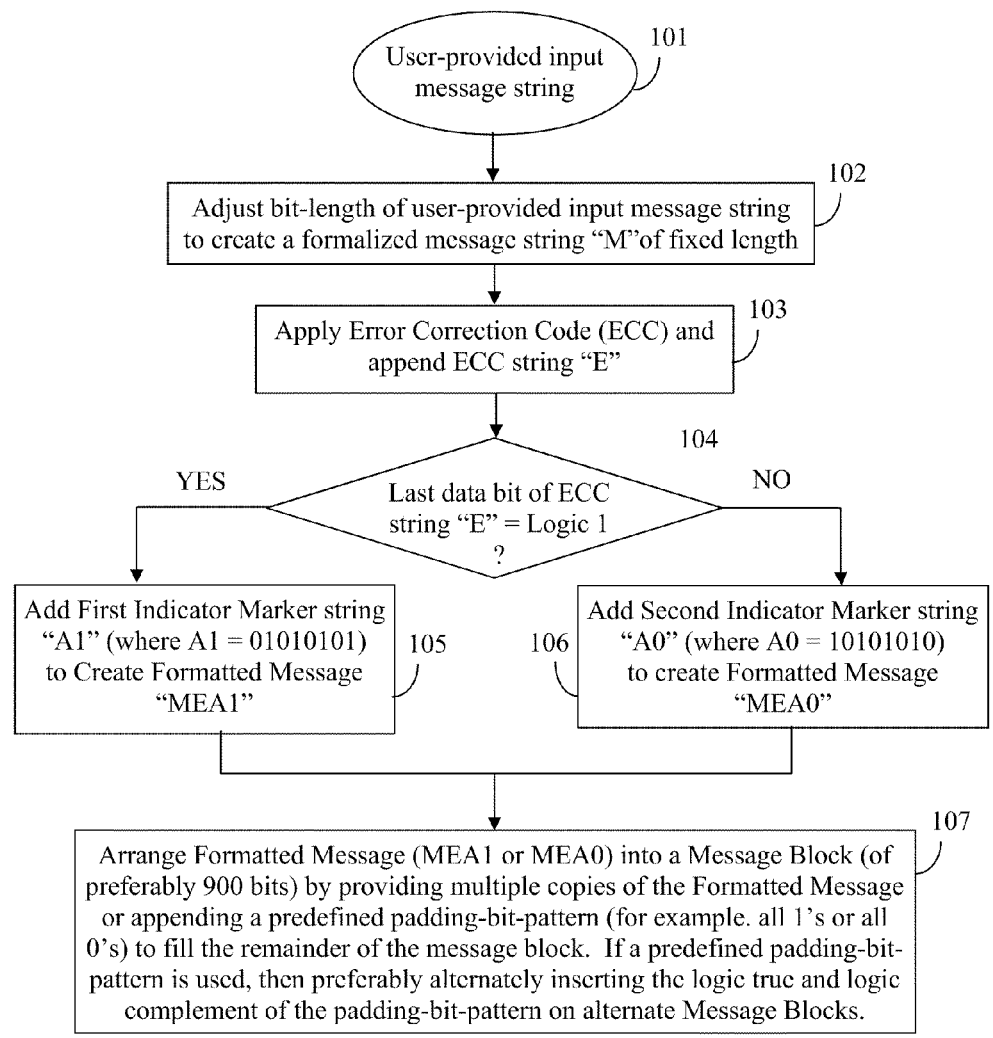
FIG. 10 illustrates a preferred method of preparing a user-provided message string for encoding onto an input image.

With reference to FIG. 10, the task of preparing a user-provided message string for later encoding onto an input image goes through the following steps. Upon receiving a user-provided input message string (Step 101), a formalized message string "M" is created (Step 102) by checking the length (i.e. character or bit length) of the user-provided message string and, if necessary, padding the user-provided message string with blanks (i.e. blank spaces) to make it a pre-defined, fixed length of preferably 64 bytes, or 512 bits.

If desired, error correction code (ECC) may be incorporated into the message string (Step 103). In the presently preferred embodiment, an ECC string "E" consisting of eight error correction bytes based on the Reed-Solomon technique, are appended to the formalized message string M, which makes the length of message string "ME" equal to 72 bytes (i.e. 576 bits).

Next, a predefined indicator marker string (i.e. a known bit-pattern) is added to message string ME, or to formalized message string "M" if ECC is not provided. In the following discussion, it is assumed that ECC is used. The predefined indicator marker string may be inserted at the beginning of message ME, but preferably is appended to the end of the message ME.

Further preferably, one of two predefined indicator marker strings, A0 or A1, are used, depending on whether a pre-designated bit (preferably the last bit) of ECC string E (or alternatively a pre-designated bit of formalized message string "M") is a logic high ("1") or a logic low ("0") (Step 104).

In the preferred embodiment, the first indicator marker string is defined as pattern "A1" (where A1=01010101). The second indicator marker string may be defined as the logic complement of pattern A1, and defines a complement pattern A0=10101010. It is to be understood that second indicator marker string A0 may be any string pattern distinct from first indicator marker string A1, but it is presently preferred that A0 be the logic complement of A1. The point is that either pattern A1=01010101 or complement pattern A0=10101010 is added to message ME, depending on the last bit of ECC string E to create a formatted message MEA1 or MEA0. Further preferably, if the last bit of ECC string E is 1, then pattern A1 is appended (Step 105), and if the last bit of ECC string E is 0 then complement pattern A0 is appended (Step 106).

The resultant formatted message (either MEA0 or MEA1) is then arranged into a message block of 900 bits (Step 107), and preferably the message block is of enough bits to span 2.5 percent of the input image. In one embodiment, multiple copies of the formatted message (MEA1 or MEA0) may be copied to fill the message block of 900 bits. Alternatively, the formatted message (MEA1 or MEA0) may be padded with a known bit pattern or with a series of identical bits, such as all zeros or all ones, to fill the complete message block (preferably a perfect square) of 900 bits. If a known bit pattern (such as a series of identical bits) is used, then it is preferred that on alternate message blocks, the message blocks have all zeros or all ones padded onto the end of the formatted message to complete the 900 bits, as described in Step 107.

Thus, after the aforementioned steps, the original user-provided message becomes a formatted message defined as MEA1 or MEA0 (i.e., formalized message string M+Error Correction Code string E+indicator marker string A0 or A1, depending on the last bit value of E) and arranged into a message block of 900 bits with zeros or ones padding the end of the formatted message on alternate message blocks.

Having discussed how to correct for skew error as described in FIG. 9, how to generate a formatted message block as shown in FIG. 10, and how to create a mask block as shown in FIG. 6, one may now provide an overview of the presently preferred encoding processes for applying a watermark message onto an input image. One preferred preparation step prior to watermarking an input image, however, is to assure that the input image is subdivided into image blocks.

Figure 11:
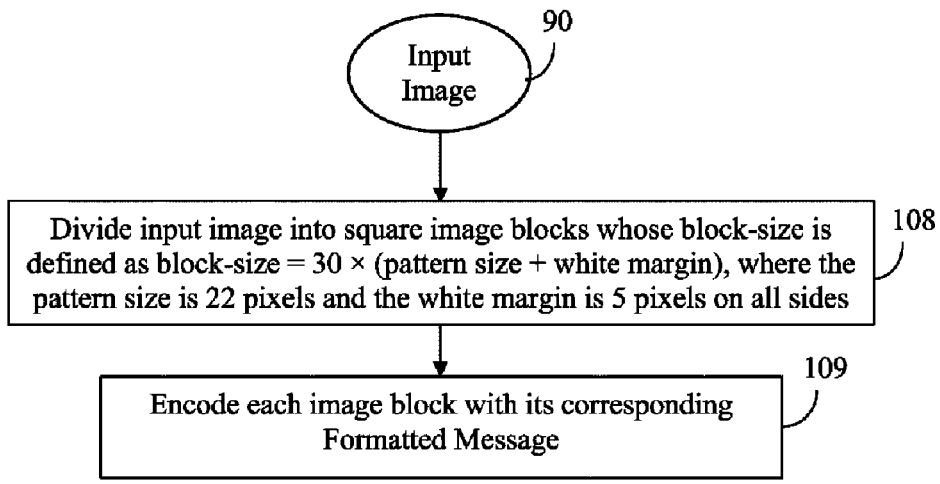
FIG. 11 shows an exemplary method of subdividing an input image into multiple image blocks for encoding a formatted message therein.

FIG. 11 shows an exemplary method of subdividing an input image 90 into multiple image blocks (step 108). Preferably, the image blocks are square in shape and have a block-size defined as block-size=30×(pattern size+white margin), where the pattern size is 22 pixels and the white margin is defined as 5 pixels on all sides. Each image block may then be encoded (Step 109) with the appropriate formatted message (containing MEA1 or MEA0), as defined in FIG. 10.

Figure 12:
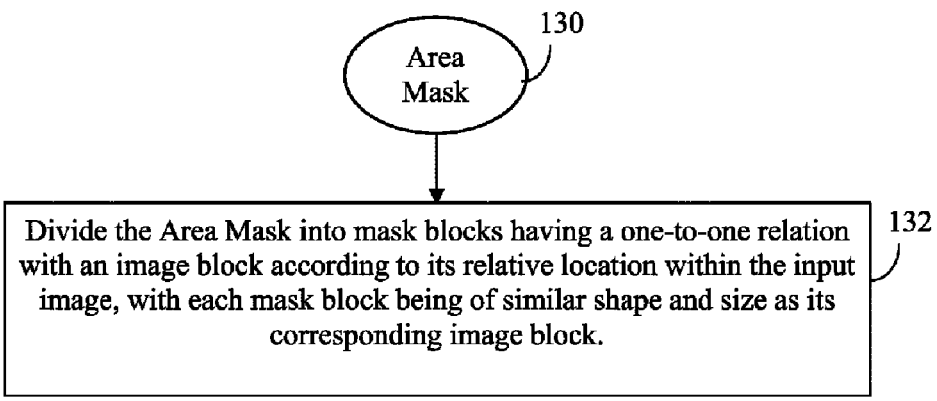
FIG. 12 illustrates that if a connected components mask has not previously been subdivided into mask blocks and generally spans the entirety of the input image, then it is divided into mask blocks of shape, size and number corresponding to the image blocks, with each mask block having a one-to-one relationship to its corresponding image block according to its relative location within the input image.

It is to be understood that before the image block may be encoded with the formatted message (or equivalently, with a corresponding message block); a connected components mask is first created (as described in FIG. 6) to identify areas of the image block suitable for encoding with the formatted message. As is explained above, it is preferred that the connected component mask be divided into multiple mask blocks, as described in FIG. 6. However, as is shown for illustration purposes in FIG. 12, if a connected components mask 130 has not previously been subdivided into mask blocks and generally spans the entirety of the input image, then it is divided (step 132) into mask blocks of shape, size and number corresponding to the image blocks, with each mask block having a one-to-one relationship to its corresponding image block according to its relative location within the input image. The mask blocks may have a logic-1 indicating regions of the image blocks where message information may be encoded, and have a logic-0 indicating image block regions where no message information may be encoded.

Figure 13:
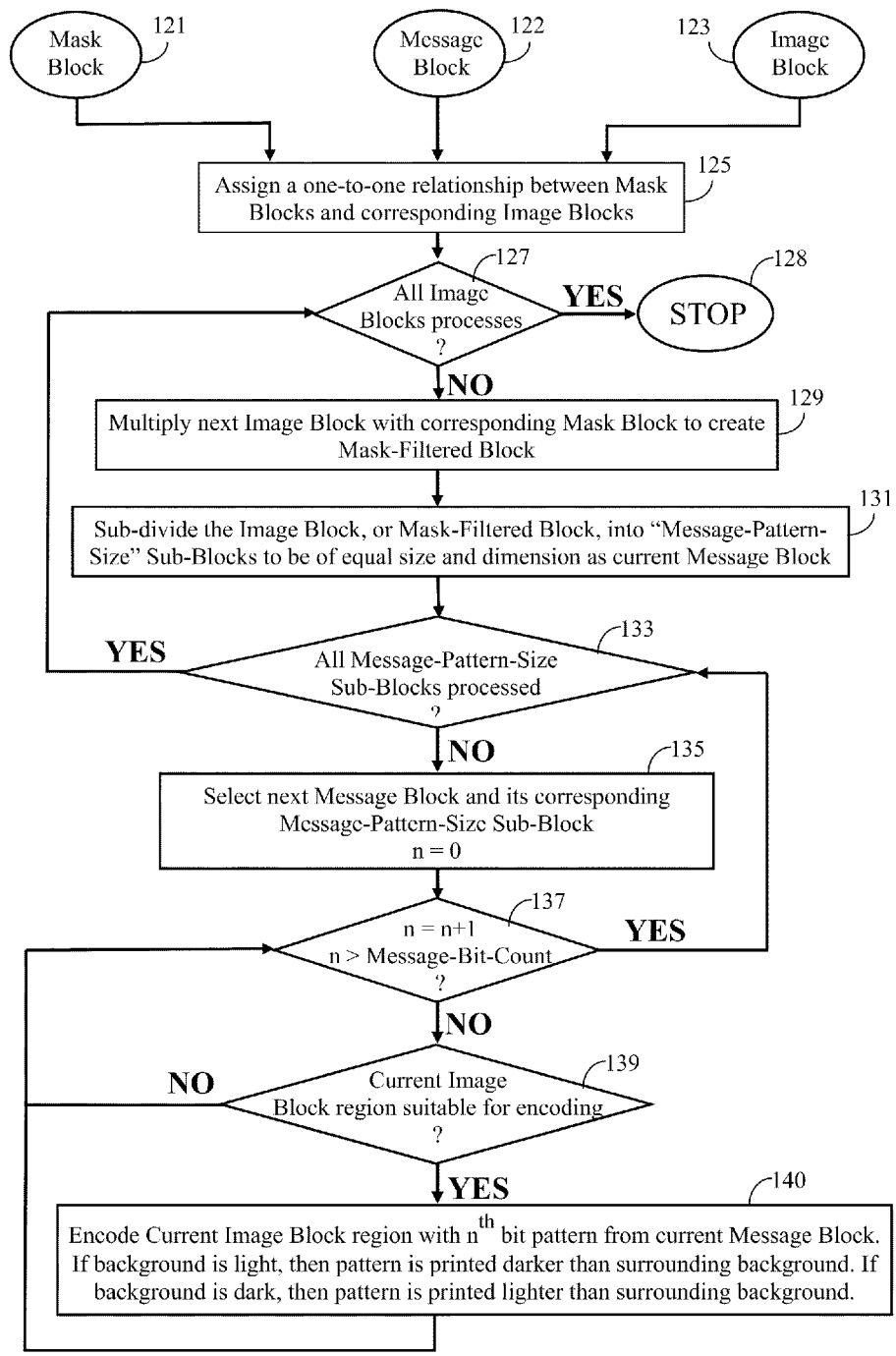
FIG. 13 illustrates a presently preferred watermark encoding sequence.

With reference to FIG. 13. a watermark encoding sequence may begin by providing a mask block 121, a message block 122, and an image block, and a one-to-one relation is established between each mask block and its corresponding mask block (step 125). As is explained above, an input image may be divided into multiple image blocks, and the connected components mask may also be divided into multiple mask blocks of equal number and size as the image blocks.

As is also explained above, a formatted message block may be of fixed size (preferably 900 bits), and has alternating message content in alternate message blocks based on formatted message MEA0 or MEA1 and any predefined padding-bit-pattern. It is to be understood that the message blocks are not necessarily square in shape nor are they the same size as the image blocks. It is presently preferred that the message blocks be smaller than the image blocks.

If all image blocks have been processed, then the encoding sequence ends at step 128, but if all image blocks have not yet been processed (step 127), then based on the message length and pattern dimensions, an image block 123 extracted from the input image is multiplied by its corresponding mask block 121 to create a mask-filtered block (step 129). The resultant mask-filtered block, which masks out areas of the image block where data bit patterns should not be encoded, is further subdivided into message-pattern-size sub-blocks.

When all message-pattern-size sub-blocks have been processed (step 133=YES), i.e. watermark encoded, then the process returns to step 127 to determine if another image block remains to be processed.

Assuming that a message-pattern-size sub-blocks requires encoding (step 133=NO), the bit patterns defined by the formatted message MEA0 or MEA1 that defines a current message block is overlaid on (i.e. encoded onto) its corresponding message-pattern-size sub-block (step 135). It is to be noted that data bit patterns are not overlaid on foreground regions of the image block. Another important aspect of the present method is an adjustment of color of the watermark patterns. For lighter regions of the image block, the watermark pattern is made dark (i.e. darker than surrounding image block pixels), and for darker regions of the image block, the watermark pattern is overlaid in lighter color (lighter than surrounding image block pixels).

The total number of watermark pattern symbols in a message block is identified as "message-bit-count", and the encoding of the watermark message begins by defining a counting variable n equal to 0 (step 135). When counting variable n exceeds the message-bit-count (step 137=YES), it means that all of the watermark pattern symbols have been encoded (i.e. incorporated into the current message sub-block), and processing returns to step 133 to determine if any additional sub-blocks remain to be encoded.

If n is not higher than the message-bit-count (step 37=NO), then it is determined if the current image block region defined by the current message-pattern-size sub-block is suitable for encoding (step 139). That is, if step 139 identifies the current sub-block region not suitable for encoding (step 139=NO), then the processing returns to step 137. Conversely, if step 139 identifies the current sub-block region as suitable for encoding (step 139=YES), then processing proceeds to step 140, and the $n^{th}$ bit pattern from the message block is encoded onto the current region of the image block. As is explained, above, if the current image block region is background and a relatively light region of the input image (as defined by an intensity value of 225 or higher), then the pattern symbol is encoded in a color darker than its surrounding background pixels. Similarly, if the current region is a background region of the input image and is a relatively dark region (as defined by an intensity value of 35 or lower), then the pattern symbol is encoded in a color lighter than its surrounding background pixels.

Figure 14A:
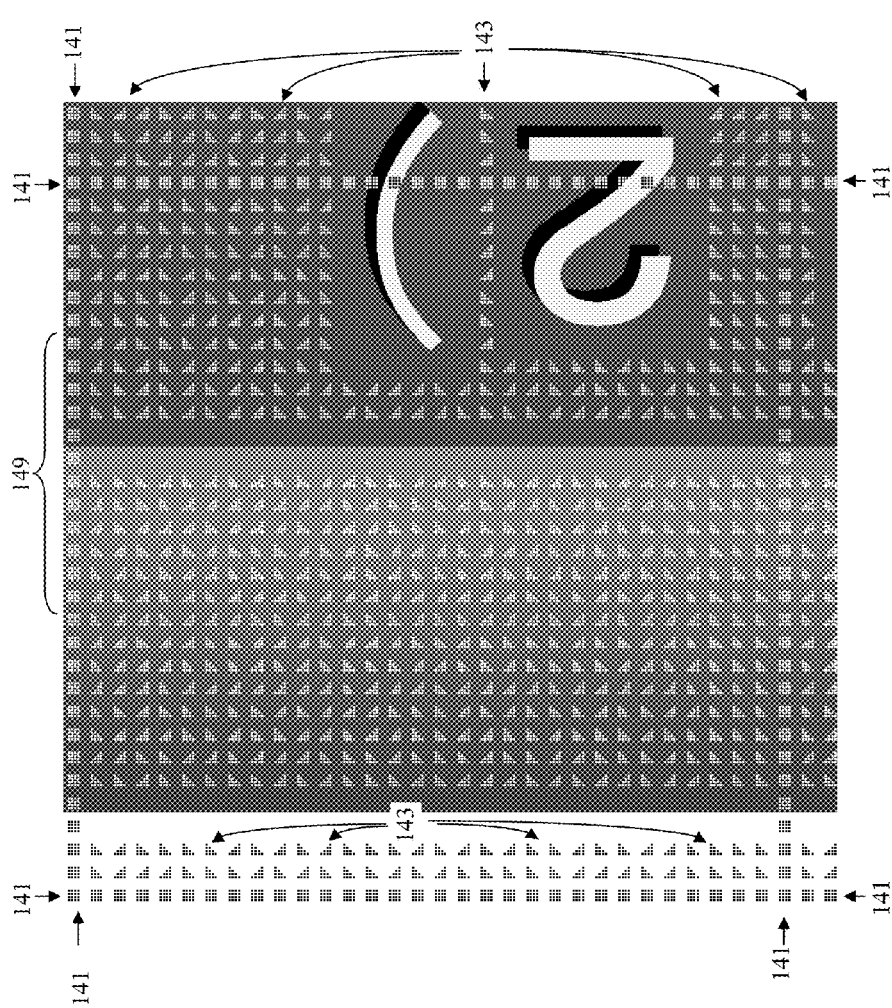
FIG. 14a is an example of an encoded image block.

An example of an encoded image block is shown in FIG. 14a. The "marker" bit patterns 141 (square arrangement of dots) are overlaid on the entire image block, whereas, the "logic" bit patterns 143 (triangular arrangement of dots) are only overlaid only on the background regions. This is required due to the high dependence of the decoding stages on the correct recognition of the marker regions. The luminosity level of the patterns is changed based on the average intensity of the image block. For white background regions, such as on the left side of FIG. 14, the marker bit patterns 141 and logic bit patterns 143 are black (or darker than their surrounding background), whereas for dark background regions, such as the right side of FIG. 14, the marker bit patterns 141 and logic bit patterns 143 are white (or lighter than their surrounding background). It should be noted that for background regions that are not fully black or fully white, such as the region identified by reference character 149, marker bit patterns and data bit patterns are printed in an intensity lighter or darker, respectively, than their surrounding pixels. However, the actual color of the bit and marker patterns may be determined by the color of their surrounding pixels so as to blend in with the colors of the surrounding pixels. In an alternate embodiment of the present invention, the color of the bit and marker patters are selected to blend with their surrounding pixels.

Figure 14C:
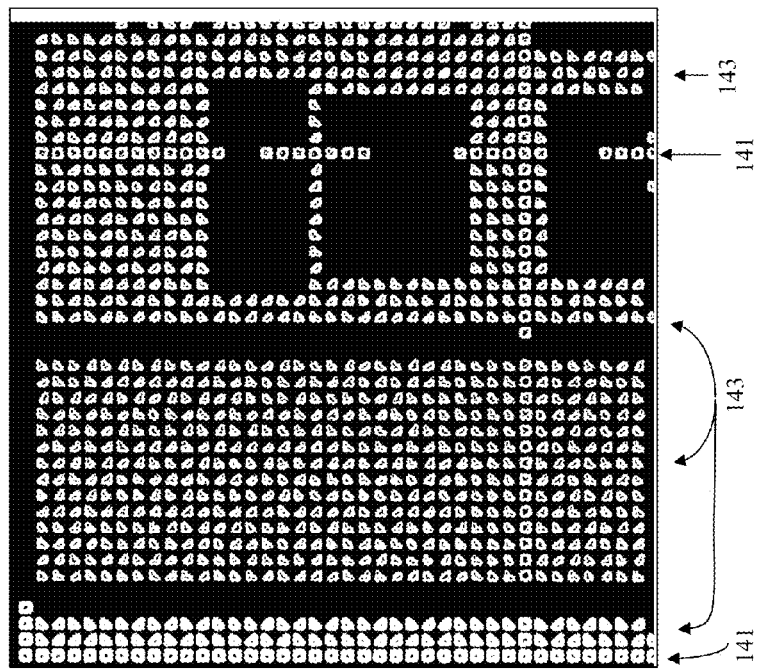
FIG. 14c shows the image of FIG. 14b after partial processing in preparation for extracting an encoded watermark message.
Figure 14B:
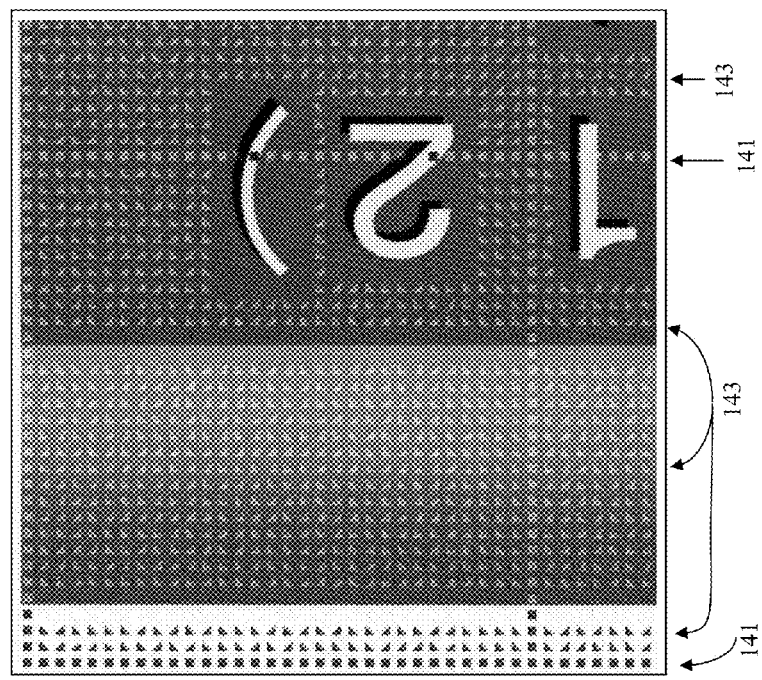

FIG. 14b represents a scan of the image of FIG. 14a, and image 14b shows same image after partially processing in preparation for extracting the encoded watermark message. In FIGS. 14b and 14c, elements similar to those of FIG. 14a have similar reference characters and are described above. As is explained more fully below, to help overcome reproduction errors resulting from print-and-scan cycles, the image of FIG. 14b is preferably converted to a binary image in FIG. 14c (with regions not having data or bit patterns blacked out) to facilitate identification of the marker bits and data bits.

Figure 15:
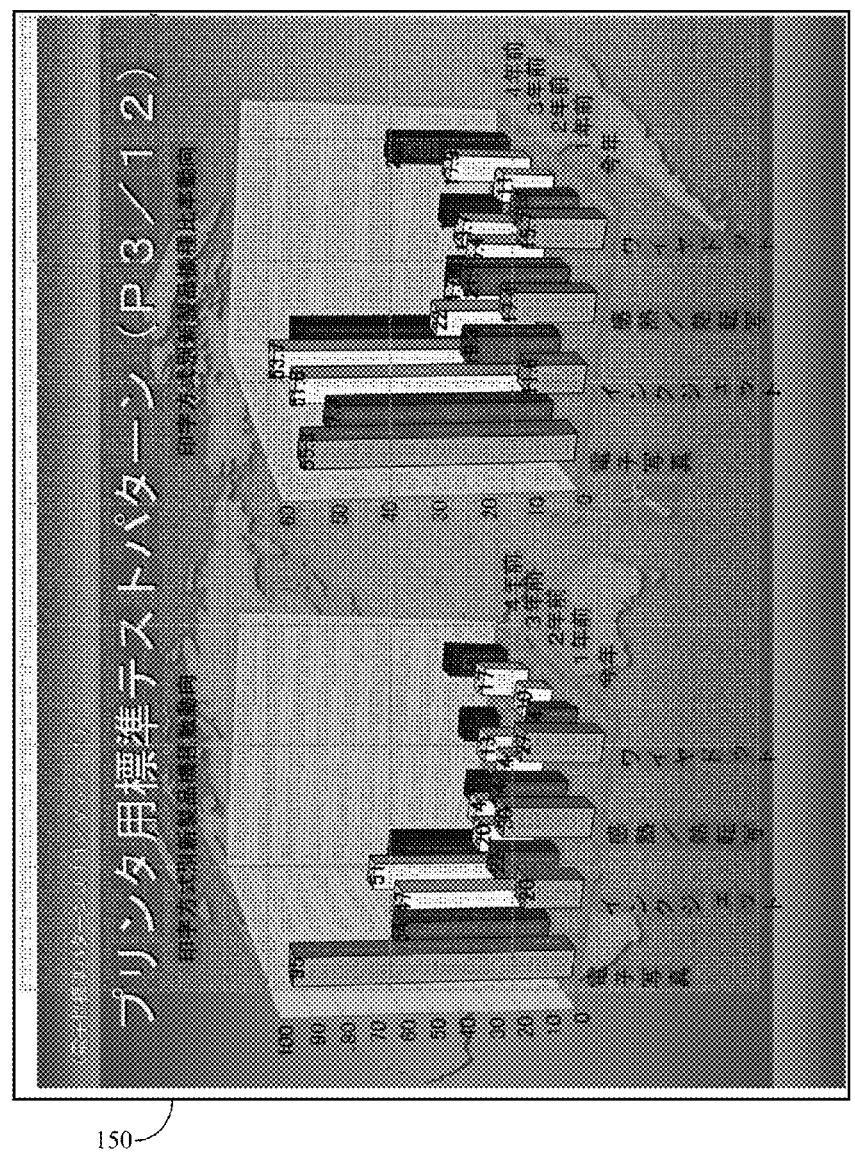
FIG. 15 is a sample input image with a watermark message printed upon it.

Another example of an input image with a watermark message printed upon it is shown in FIG. 15. As shown, the watermark patterns are dark on the light areas of the input image 150, and they are light in the darker areas of the input image 150.

Recovering (i.e. reading, deciphering, or extracting) a watermark message from an image that has undergone a print-and-scan cycle requires some pre-processing. This is because once an image undergoes a print-and-scan cycle, the scanned image may appear very different from the original image. The print-and-scan cycle introduces non-linear transformations in addition to color changes. Apart from color changes, one of the transformations that are addressed within the present invention is the introduction of small rotations introduced due to small misalignments between the scan bed and the paper edges, as is described above in reference to FIG. 9. It is presently assumed that such rotations are less than 2°.

Figure 16:
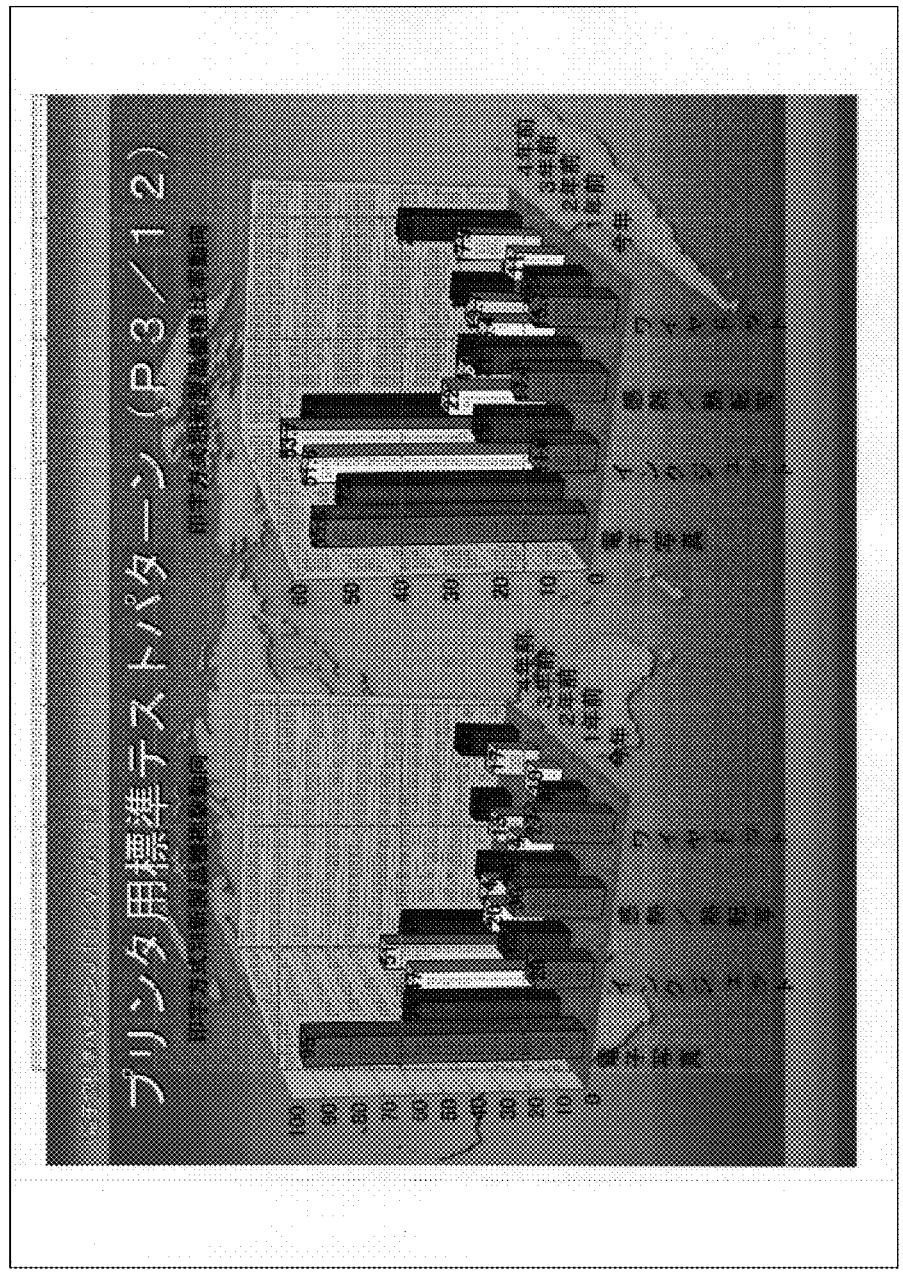
FIG. 16 illustrates the image of FIG. 15 after undergoing a transformation resulting from a print-and-scan cycle.

An example of such transformation is illustrated in FIG. 16, which shows a resultant image after the image of FIG. 15 undergoes a print-and-scan cycle using an Epson® CX11 multifunction device, which has integrated fax/copier/scanner/printer functionality.

The following discussion will use a different sample image to illustrate the presently preferred process for decoding a watermark message from a watermarked image. The decoding process includes two key steps (i.e. a pre-processing step and message extraction step) that are described separately in more detail below.

Figure 17:
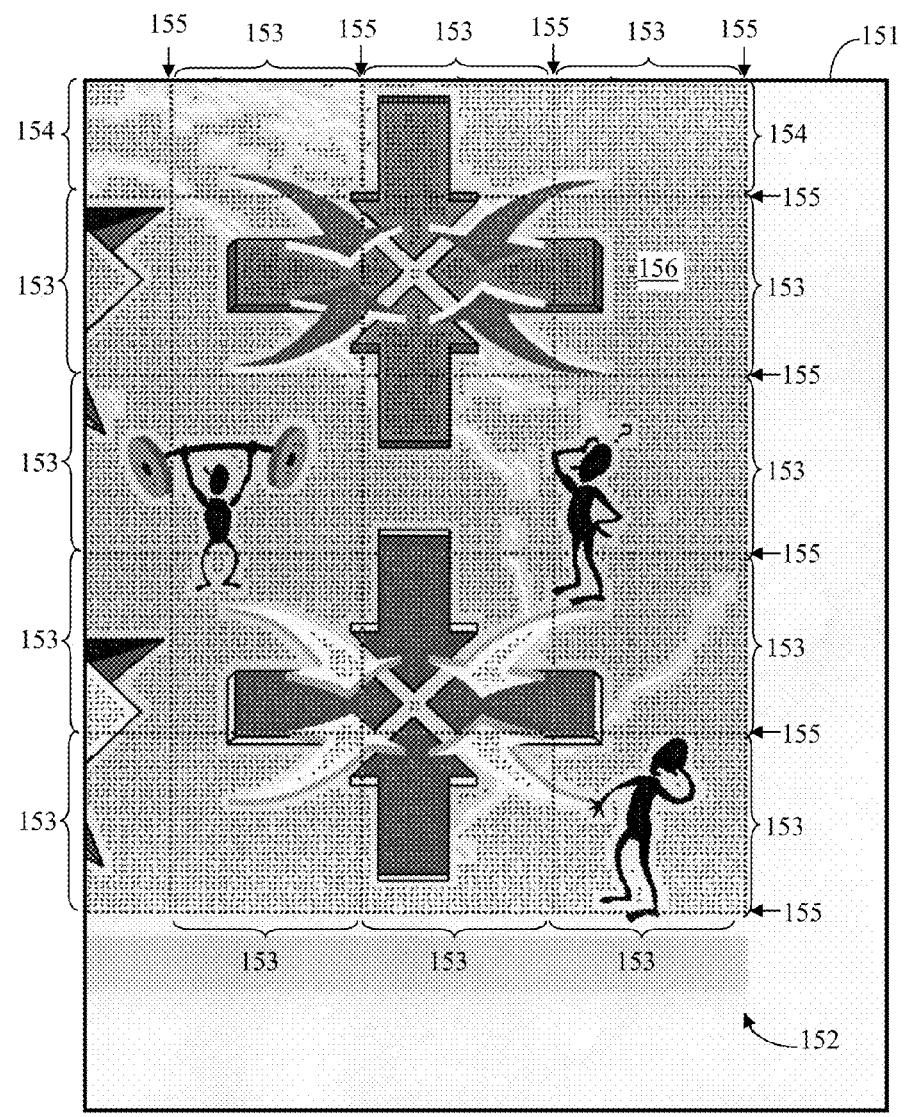
FIG. 17 shows a page having another sample image with multiple message blocks outlined by marker bits.

FIG. 17 shows a page 151 having a sample image 152 with multiple message blocks 153 (square in shape) outlined by marker bits 155. Data bits 156 are contained within the boundaries of message blocks 153. As is explained above, the watermark messages are extracted from within the message blocks 153. However, since an image from which a watermark message is to be extracted may have been cropped (or otherwise distorted) so that the message blocks 153 do not necessarily begin at the upper left corner of page 151, or of sample image 152, a preprocessing step is necessary to identify a corner of a message block 153 prior to applying a bit extraction step. Indeed, sample image 152 shows partial message blocks 154 along its top that have been partially cut off, such as from a prior cropping action.

Figure 18:
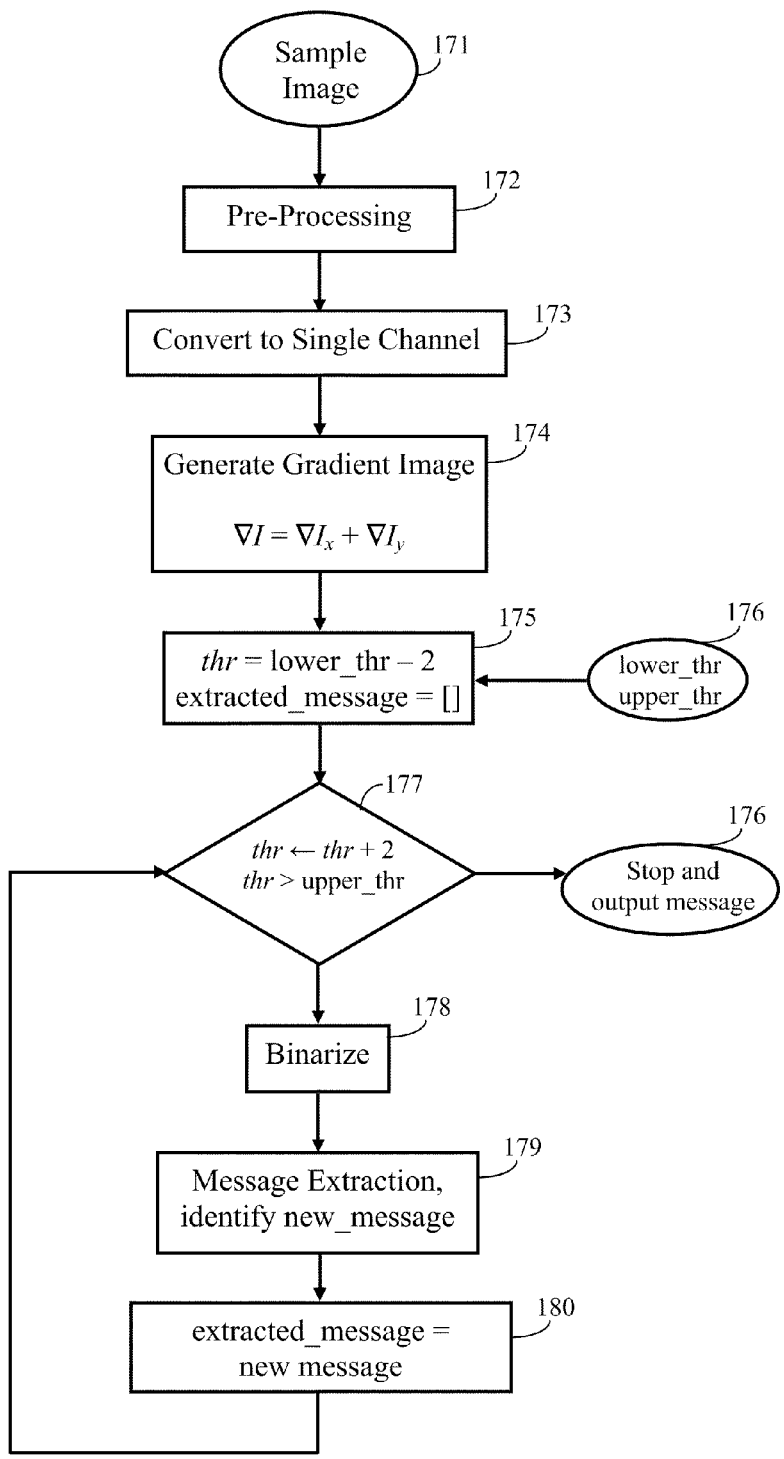
FIG. 18 shows a general process for decoding a watermark message.

FIG. 18 shows a general process for decoding a watermark message, which includes two key steps: a pre-processing step 172 and message extraction step 179. First, the supplied sample image 171 is applied to pre-processing step 172, which includes several sub-step described in more detail below. Generally, preprocessing step 172 corrects for any skew error in sample image 171, removes any white border around sample image 171, reviews sample image 171 to identify a good corner of a message block, and crops and rotates sample image 171 to place the identify good corner at the upper left corner of the rotated image. The identified good corner is placed at the upper-left corner because message extraction step 179 assumes this arrangement in order to read a message block from left-to-right and from top-to-bottom starting from the upper-left corner of the image. It should be noted, however, that since the corner identified processing step 172 is not necessarily the top left corner of a message block, message extraction step 179 will have to determine for itself the true top-left corner of a message block. This is because the supplied sample image 171 is not necessarily right-side-up, but may have any orientation, such as being upside-down in landscape or portrait view.

After having identified the best corner of a message block and aligning it with the upper-left corner of the image, the resultant image is converted to a single channel (step 173) in a manner similar to that described above in reference to step 53 in FIG. 6. A gradient image is then created in step 174 in a manner similar to that of step 55 in FIG. 6. Step 175 makes use of two user-provided threshold options, a lower threshold, "lower_thr", and an upper threshold, "upper_thr". A variable thr (i.e. a first variable memory location or memory space), is set to a value of two less than lower_thr, and a character array "extracted_message" (i.e. second variable memory location or second memory space) is set to hold the message string that will be decoded.

Step 177 increases thr by a value of two, and then checks if the increased value of thr now exceeds the upper threshold, upper_thr. Steps 177-179 are repeated until thr exceeds upper_thr. When thr exceeds upper_thr, the process stops (step 176) and "extracted_message" holds the deciphered watermark messaged.

Binarize step 178 creates a binarized image using the threshold thr in a manner similar to step 57 in FIG. 6. The binarized image is a pre-step in preparation for creating a mask that determines which pixels are included in a search for message bits, and which are avoided, as illustrated in FIG. 14c. Thus, during each cycle, the number of pixels included for examination, i.e. the mask sensitivity, is decreased and the best message extracted during all the cycles is outputted (step 176) after the last cycle, as determined by step 177.

Extract message step 179 receives the output from binarize step 175. Extract message step 179 creates a mask, searches for marker bits and data bits, identifies any data bit characters, creates a message string from the identified data bit characters, compares the characters in the currently created message string with the characters identified in previous cycles to determined the most probably character string, and stores this most probable character string as the current "new message". As is explained above in reference to FIG. 6, the connected component size is selected to be closed to a pattern symbol size in order to identify pattern images of the printed bit patterns. Details of this extract message step 179 are provided below. Finally, the "new message" is copied to memory space "extracted_message" (step 180).

Preprocessing step 172 includes several sub-steps. Before describing these preprocessing sub-steps, it may be beneficial to first pictorially illustrate some of theses preprocessing sub-steps using a simplified sample image, as shown in FIG. 19.

Figure 19:
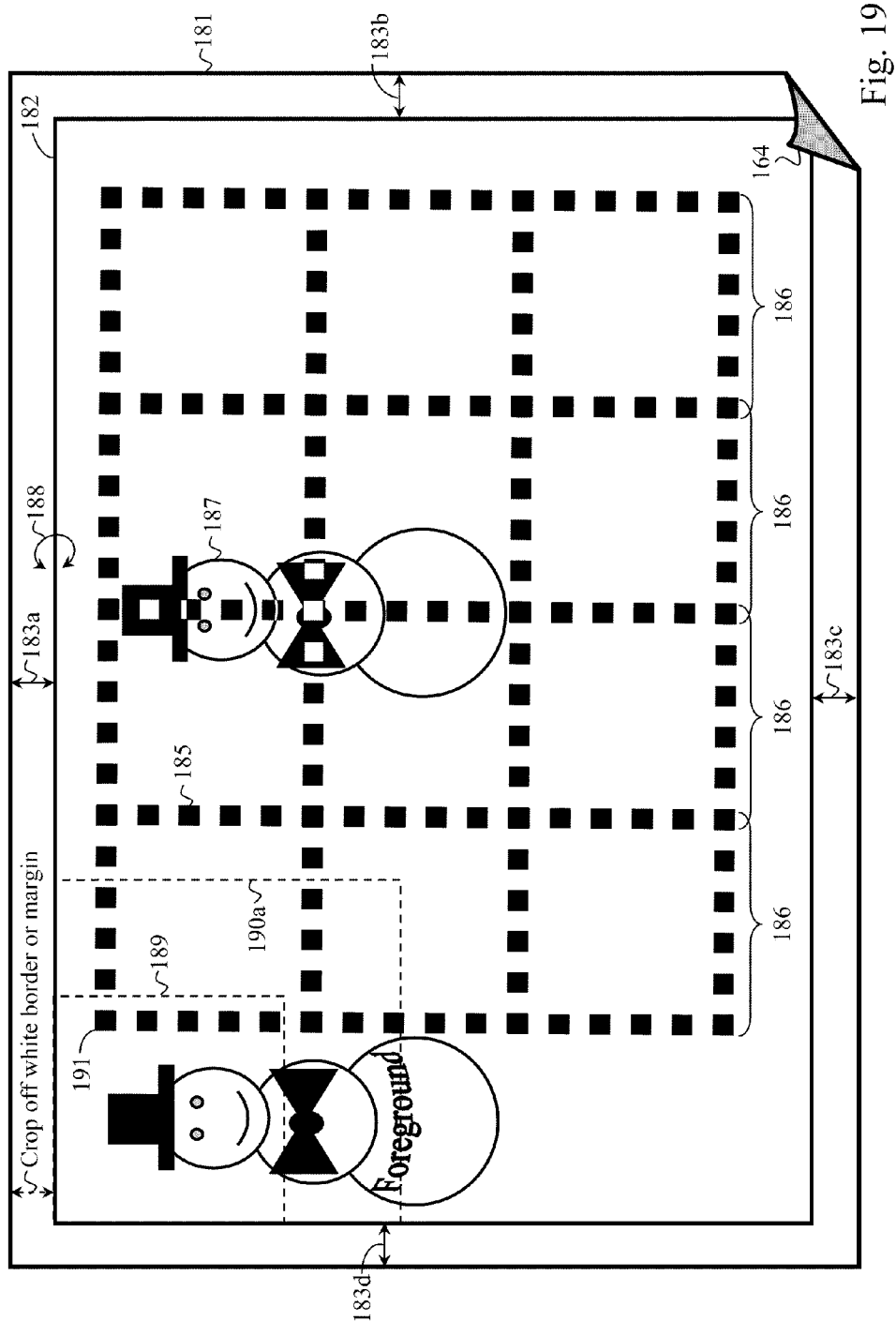
FIG. 19 is a simplified illustration highlighting elements of a scanned image.

With reference to FIG. 19, paper flap 164 identifies the lower right corner of a sample page 181, which holds a scanned image 182. As shown, a printer or scanner may introduce a white border, or margin, 183a-183d of undetermined thickness at any or all sides of scanned image 182. In sample scanned image 182, the marker bits are represented as black squares 185. It is to be understood that the data bits (not shown) that constitute the watermark message would be distributed within the boundaries of each message block 186, as defined by the rows and columns of marker bits 185.

Although it is preferred that watermark blocks 186 be overlaid on the entirety of a watermark image, FIG. 19 illustrates that within a sample image submitted for deciphering, watermark blocks 186 might be shown on only a portion of the sample image 182 by design, or by cropping, or by some other editing manipulation. However, FIG. 18 emphasizes that within the areas where message blocks 186 are shown, the marker bits 185 are printed continuously across both foreground and background areas of the scanned image 182. In the present example, the marker bits 185 that are printed upon foreground snowman 187 are dark when printed on light areas of snowman 187 (such as when printed over empty areas of the snowman's torso), and are light when printed on dark areas of snowman 187 (such as when printed on the snowman's hat or bowtie).

An early preprocessing sub-step crops off (i.e. removes) the top white, border or margin 183*a* until a dominant line of dark pixels 188 of scanned image 182 is encountered, as is explained below. Next is to search for the best message block 186 available in scanned image 182. To do these, one may begin with a search window 189 whose size is equal to the size of a message block 186. However, since the dimensions of a scanned image might be distorted during a scanning operation, it is preferred that one begin with a search window 190*a* whose side lengths are one and half that of the message block's corresponding side lengths. In the present example, the message blocks 186 are square, so each side of search window 190*a* is 1.5 times the length of a side of a message block. The preprocessing sub-steps then proceed to search within the current search window 190*a* to identify the best possible corner marker bit of any (full or partial) message block 186 with the current search window 90. In the present example of FIG. 18, that would be corner 191. Criteria for identifying the best corner of a message block are defined more fully below.

In the following discussion, all elements of FIGS. 20-23 similar to those of FIG. 19 have similar reference characters and are described above.

Figure 20:
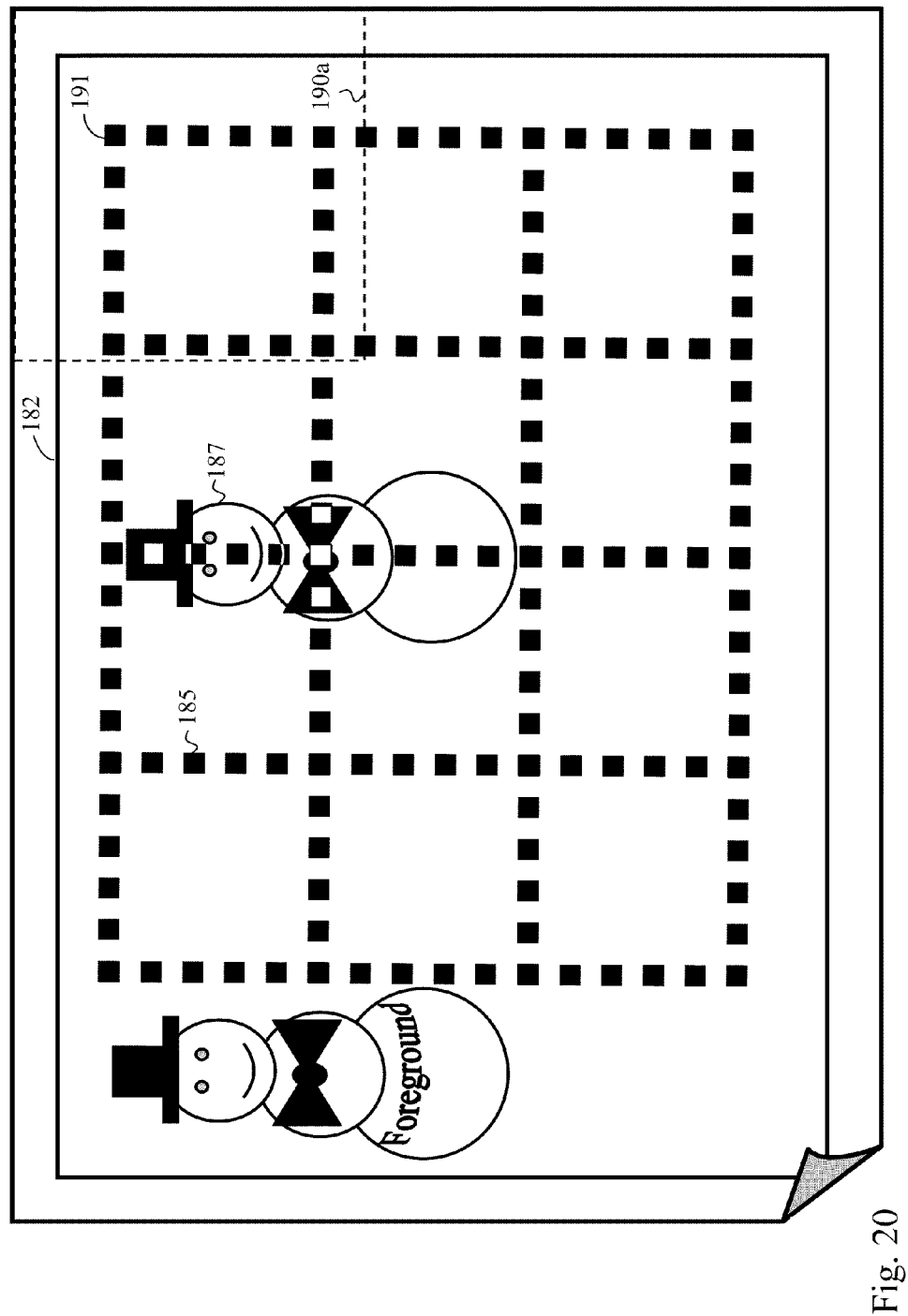
FIG. 20 illustrates image of FIG. 19 rotated by 90°.

The image of FIG. 19 is then rotated 90°, resulting in image 182 of FIG. 20, and preprocessing sub-steps that were applied to FIG. 19 are now applied to the current image 182 of FIG. 20. In the present example, search window 190*a* now identifies the new upper-left corner (after rotation), and within search window 190*a*, the current best corner marker bit 191 is again identified.

Figure 21:
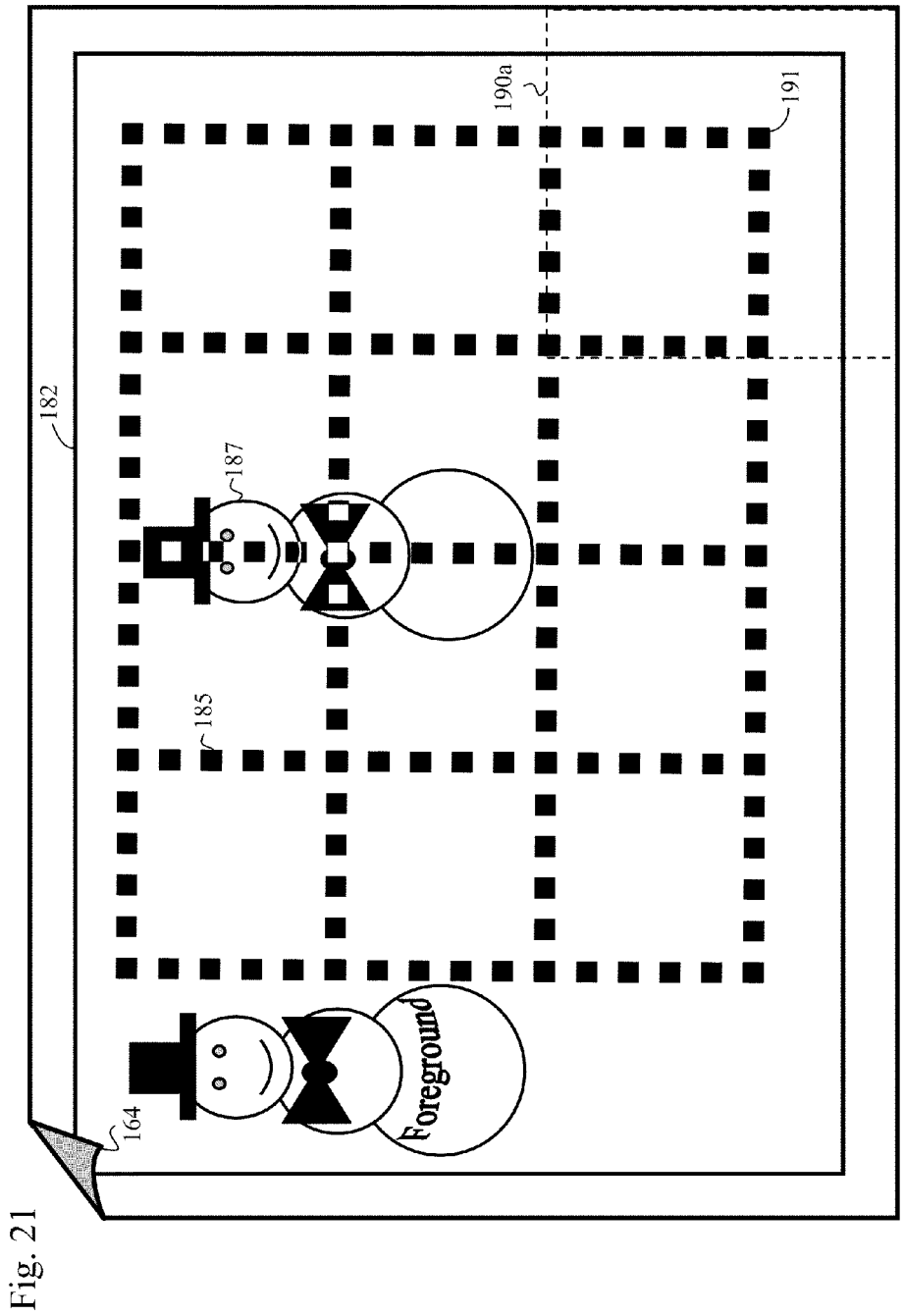
FIG. 21 illustrates the image of FIG. 20 rotated by 90°.

The image of FIG. 20 is then rotated 90°, as shown in FIG. 21, and preprocessing sub-steps that were applied to FIG. 19 are applied to the current image 182 of FIG. 21. In the present example, search window 190*a* is applied to the new upper-left corner, and the current best corner marker bit 191 is again identified.

Figure 22:
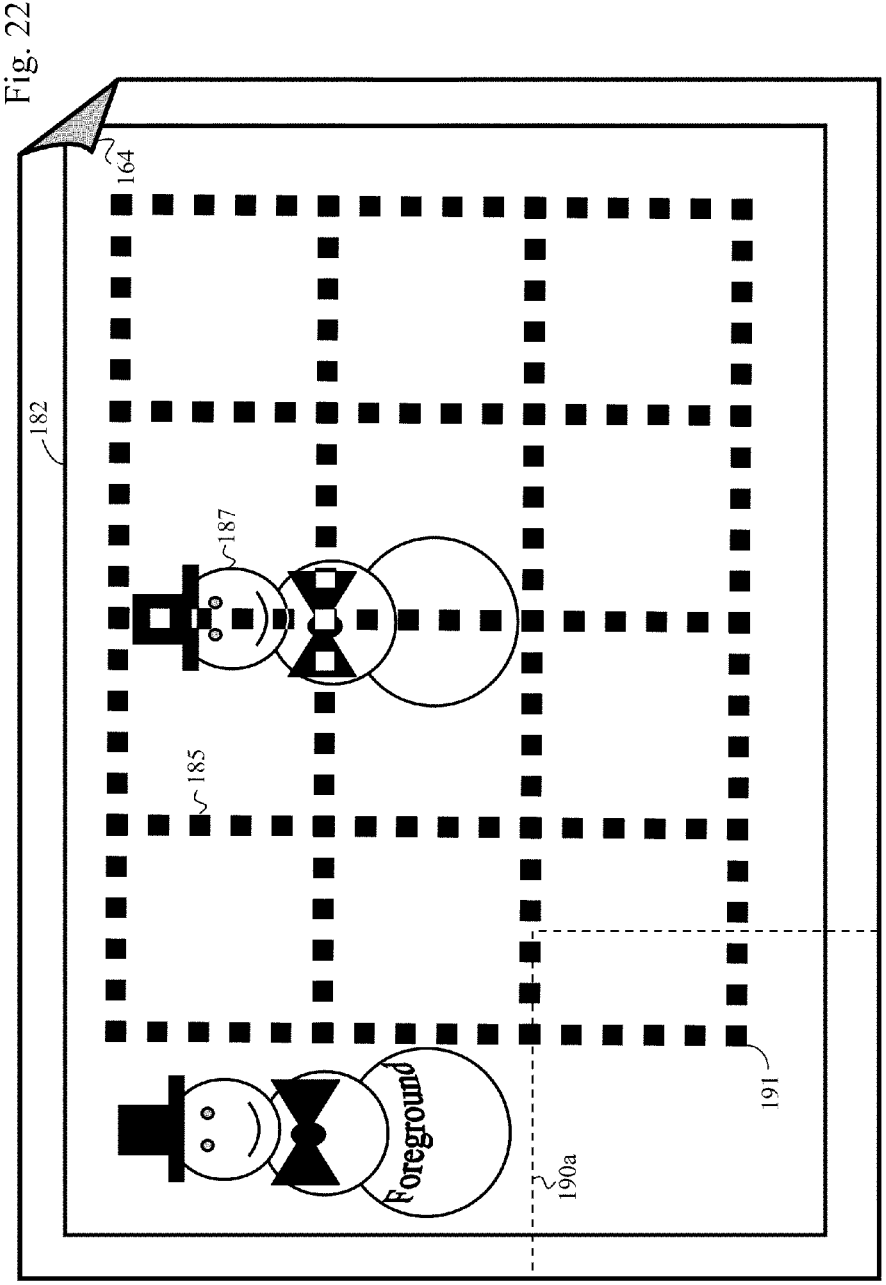
FIG. 22 illustrates the image o FIG. 21 rotated by 90°.

The image of FIG. 21 is then again rotated 90°, as shown in FIG. 22, and preprocessing sub-steps that were applied to FIG. 19 are applied to the current image 182 of FIG. 22. In the present example, search window 190*a* is applied to the new upper-left corner, and the current best corner marker bit 191 is again identified.

Figure 23:
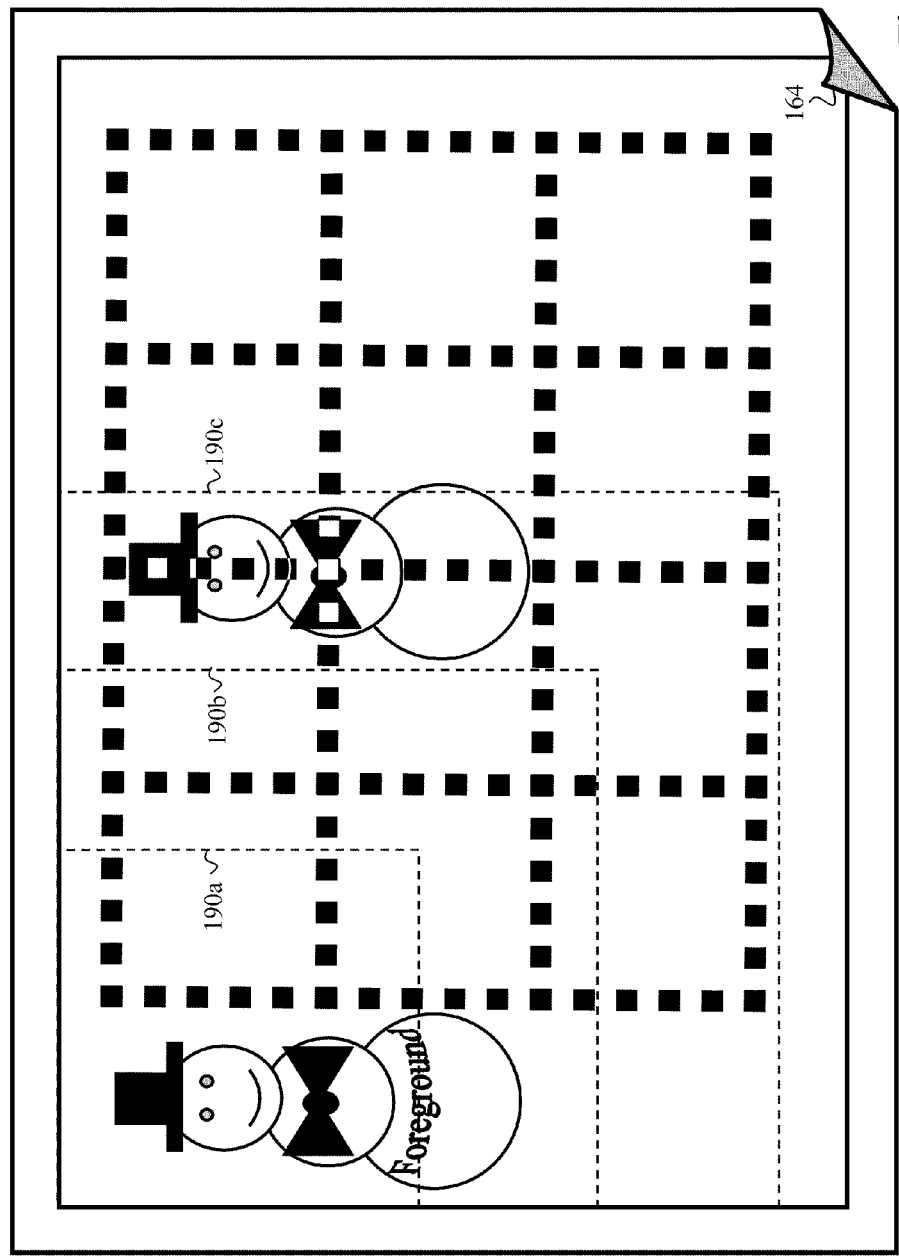
FIG. 23 illustrates that the search window used for searching for the best corner is increased by 50% in each of multiple search cycles.

The repeated application of search window 190*a* to each of the four corners of image 182 as is illustrated in reference to FIGS. 19-22, is then preferably repeated two additional times. Each time, the size of search window 190*a* is increased by 50% to create larger search windows 190*b* and 190*c*, as shown in FIG. 23. At the ends of these repeated cycles, the best corner would have been identified and the sample image 182 is cropped and rotated to place the best identified watermark block corner at the upper-left corner to proceed with processing step 173, as described in reference to FIG. 17.

Figure 24:
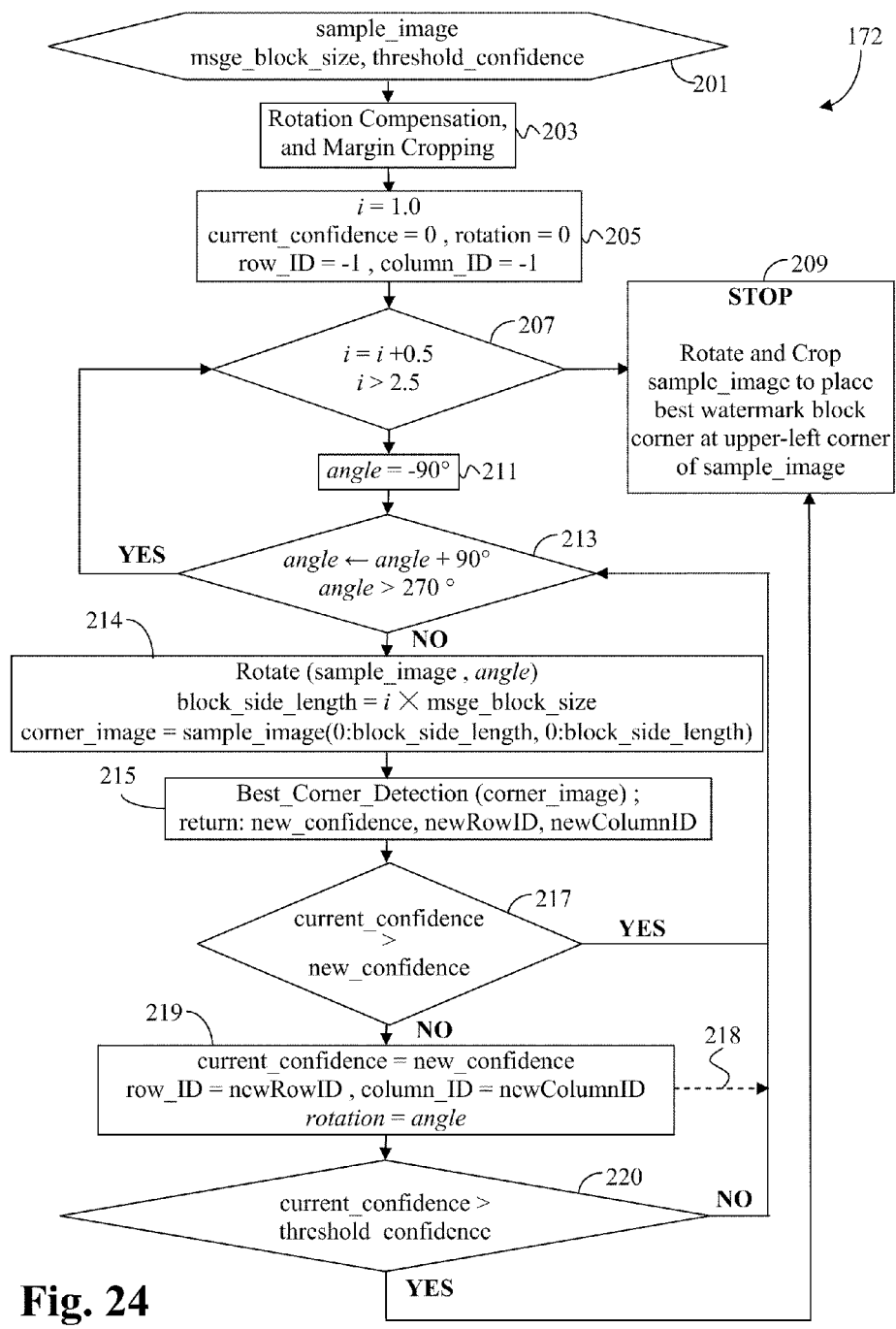
FIG. 24 provides a more detailed description of the preprocessing step 172 of FIG. 18.

With reference to FIG. 24, preprocessing step 172 of FIG. 18 receives the sample image, which may be a scanned image, a crop image or other user-provided image, and essentially rotates and crops the sample image so that the top-left corner of the sample image coincides with a corner of a message block. In this way, decoding (i.e. message extraction) can begin in a left-to-right, top-to-bottom fashion. Pre-processing step 172 performs the following sub-steps.

Sub-step 201 receives the sample image, along with the dimensions of the message blocks and a preferred confidence level (threshold_confidence) for determining the corner of a message block. In the present case, since the message blocks are preferably square in shape, only one side dimension (msge_block_size) is necessary. It is to be understood that both of these parameters (msge_block_size and threshold_confidence) may be predefined so that they need not be specified sub-block 201.

Sub-step 203 then provides rotation compensation and margin cropping. Preferably rotation compensation is achieved by applying the skew correction process described above in reference to FIG. 9.

In the presently preferred embodiment, margin cropping is based on the assumption that printers and/or scanners may introduce a white border (i.e. margin), to images (as described above in reference to FIG. 19). Preferably, the margin cropping sub-step removes the white border from all four sides of the sample_image. This may be accomplished by starting from the top boundary of the sample_image, and proceeding downwards cropping offs rows of pixels until encountering a row whose white-pixel-count is less than 90% of the total pixel-count for that row (alternatively, until the white pixels make up less than 90% of the image row length dimension). This process may then be repeated at each of the remaining three sides of the sample_image. For example, the sample_image may be rotated three additional times, and the same process for removing rows of white pixels may be repeated at each rotation to remove the white border from all four sides.

In preparation for looking for the best message block corner, several parameters are initiated, as shown in sub-step 205. First, a dimension multiplier, i, is assigned a value of 1. As is explained above in reference to FIG. 19, search window 190*a*, which is initially 50% bigger than a margin block size, is preferably increased by 50% in each of two subsequent cycles, as is illustrated by search windows 190*b* and 190*c* in FIG. 23. Dimension multiplier, i, is used for increasing the size of the search window during each cycle.

Parameter "current_confidence" holds the current confidence level of the currently identified, best watermark block corner at the end of each cycle. Since no corner has yet been identified, this current confidence parameter is initialized to zero. Parameter "rotation" specifies the amount of rotation necessary for bringing the best identified corner of a watermark block to the upper-left corner of the image, and it is also initialized to a value of zero. Parameters row_ID and column_ID hold the Cartesian coordinates of the best watermark block corner identified after each cycle, and they are initialized to row_ID=−1 and column_ID=−1 in preparation for starting the search for the best corner.

The cycle begins with sub-step 207, which increases dimension multiplier, i, by 0.5, and then checks if the increased value of i is greater than 2.5. If i is greater, then step 172 ends at sub-step 209. Since i has is initialized to a value of 1 in sub-step 205, it takes three iterations for i to increase beyond 2.5, and thus the search window is increased only three times, as illustrated by 109*a*-109*c* in FIG. 23.

As is explained above in reference to FIGS. 19-22, during each cycle, the search window is applied to each of the sample_image's four corners. This is achieved by rotating the sample_image in 90° increments, and searching for the best watermark block corner at each increment. Parameter "angle", which is initialized to −90°, determines the four rotation angles of the sample_image during each cycle.

In sub-step 213, parameter angle is increased by 90°. Since parameter angle was initialized to −90° in sub-step 211, the value of angle after the first increment is 0°, as shown in FIG. 19. During each cycle determined by sub-step 207, the sample_image is rotated four times by 0°, 90°, 180°, and 270° as determined by sub-step 213. Thus, after increments of 90°, parameter angle will be greater than 270°, as determined in sub-step 213, and the process returns to sub-step 207 in preparation for the next cycle.

However, if parameter angle is not greater than 270° after being incremented in sub-step 213, then control transfers to sub-step 214. Here, the sample_image is rotated by the amount indicated by the value of parameter angle. Parameter block_side_length, which determines the size of the search window, is defined by the size of a message block (i.e. msge_block_size) multiplied by dimension multiplier, i. An image segment at the upper-left corner of the sample_image of size defined by the search window is hereinafter identified as "corner_image". Stated differently, "corner_image" identifies an image segment of the sample_image that coincides with the search window when the search window is superimposed on the upper-left corner of the sample_image, as currently rotated.

Module Best_Corner_Detection in sub-step 215 receives and searches the corner_image for the best watermark block corner. Module Best_Corner_Detection is one of the most important modules based on the fact that the sub-sequent processing blocks are all dependent on the output of this module. Module Best_Corner_Detection identifies all the marker bit patterns present in the image segment, and then, based on the number of continuous marker bit patterns in one direction, determines the row index and column index for each watermark block corner within the image segment. A confidence level is calculated for each identified watermark block corner. Parameter new_confidence holds the highest calculated confidence level, and the row index and column index of the corner with the highest calculated confidence are saved as parameters newRowID and newColumnID, respectively. Module Best Corner Detection is described in greater detail in reference to FIG. 25 below. _In sub-step 217, if the new_confidence parameter is greater than the current_confidence, then control flows to sub-step 219. In this case, the new_confidence value is copied to the current_confidence parameter, the newRowID is saved as row_ID, the newColumnID is saved as column_ID, and the current angle parameter that yielded the higher new_confidence is stored in parameter rotation.

On the other hand, if sub-step 217 determines that the current confidence parameter is greater than the new_confidence parameter returned by the Best_Corner_Detection module, then processing returns to sub-step 213 to check if the current search window has been applied to all four corners of the sample image. If not, then the sample_image is rotated 90° and the search window is applied to the next upper-left corner. However, if the current search window has been applied to all four corners of the sample_image, then control returns to sub-step 207 to determine if the search window should be increased by 50% and re-applied to the sample_image. If not, then processing ends with sub-step 209, which by using row_ID, column_ID, and rotation to select the sample_image corner that has the highest confidence level, and rotates and crops the image to align the best corner to the upper-left corner of the sample_image.

After sub-step 219, processing may return to sub-step 213, as indicated by dash line 218. Alternatively, option sub-step 220 determines if the current current_confidence level is greater than the threshold_confidence parameter. If so, then the currently identified watermark block corner is acceptable and processing is terminated early by returning to sub-step 209. If not, then processing continues with sub-step 213.

Figure 25:
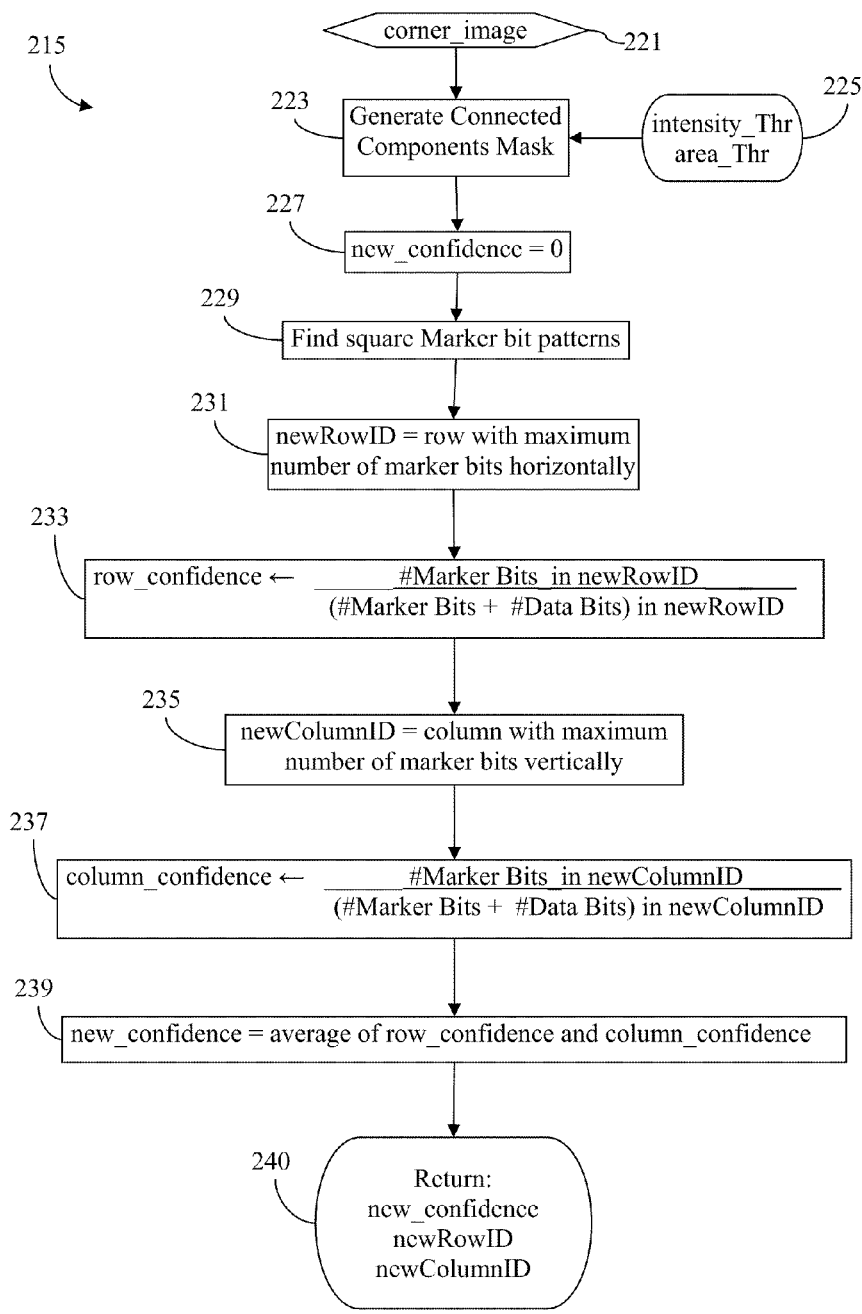
FIG. 25 provides more detailed description of module Best_Corner_Detection of sub-step 215 in FIG. 24.

With reference to FIG. 25, module Best_Corner_Detection of sub-step 215 from FIG. 24 includes several sub-steps of its own. After receiving the corner_image (sub-step 221), a connected components mask of the corner_image is generated (sub-step 223) using a specified intensity threshold and area threshold (225) in a manner similar to FIGS. 6-7, discussed above. Parameter new_confidence is initialized to zero in sub-step 227, and in sub-step 229 areas of the corner_image identified by the connected component mask are searched for marker bit patterns, as described generally above, and in particular as described in reference to FIGS. 1-5. Sub-step 231 stores the row ID of the row having the most marker bits in parameter newRowID.

In sub-step 233, a confidence metric is then calculated for row identified by newRowID. Preferably, the confidence metric is calculated by determining what fraction of the total bits (both marker bits and data bits) in row newRowID are marker bits. The calculated metric is stored in parameter row_confidence.

A similar procedure is followed for identifying the best column of marker bits. Sub-step 235 stores the column ID of the column having the most marker bits in parameter newColumnID. A confidence metric is then calculated for column identified by newColumnID in sub-step 237. Preferably, the confidence metric is calculated by determining what fraction of the total bits (both marker bits and data bits) in column newColumnID are marker bits. The calculated metric is stored in parameter column_confidence.

To determine a confidence level of the corner defined by the intersection of row newRowID and column newColumnID, sub-step 239 stores the average of row_confidence and column confidence in parameter new_confidence.

Finally, sub-step 240 returns the values of: new_confidence, newRowID, and newColumnID as outputs of sub-step 215.

FIG. 26 shows the result of applying the pre-processing process of FIGS. 18-25 to page 151 of FIG. 17. As part of the pre-processing steps, the white border areas 253 will be removed. The above described process identifies corner 255 as the best corner of a watermark block, and outline 252A extends the row and column at the intersection of corner 255 to identify the section (252A) of page 151 that will be cropped, and rotated. The right side of FIG. 26 shows the resultant cropped and rotated image 252B. As is described above, the cropped image is rotated so as to place corner 255 at the upper left corner.

Pre-processed image 252B is now ready for extracting its watermarked message, as describe in steps 173-180 of FIG. 18. The following is a more detailed description of this process, and in particular, a more detailed description of message extraction step 179. This message extraction phase incorporates string matching. The presently preferred process can handle message extraction irrespective of whether pre-processed image 252B is in known correct orientation, or is in an unknown landscape or portrait mode. It is to be understood, however, that if it is known that pre-processed image 252B is correctly oriented with its watermarked message written from left-to-right starting from its upper-left corner, then the sub-steps for determining correct landscape/portrait mode and orientation may be skipped. Additionally for ease of explanation, the following message extraction sub-steps are described with reference to the close-up views provided by the sample images of FIGS. 7a and 14a-14c, described above.

Figure 27:
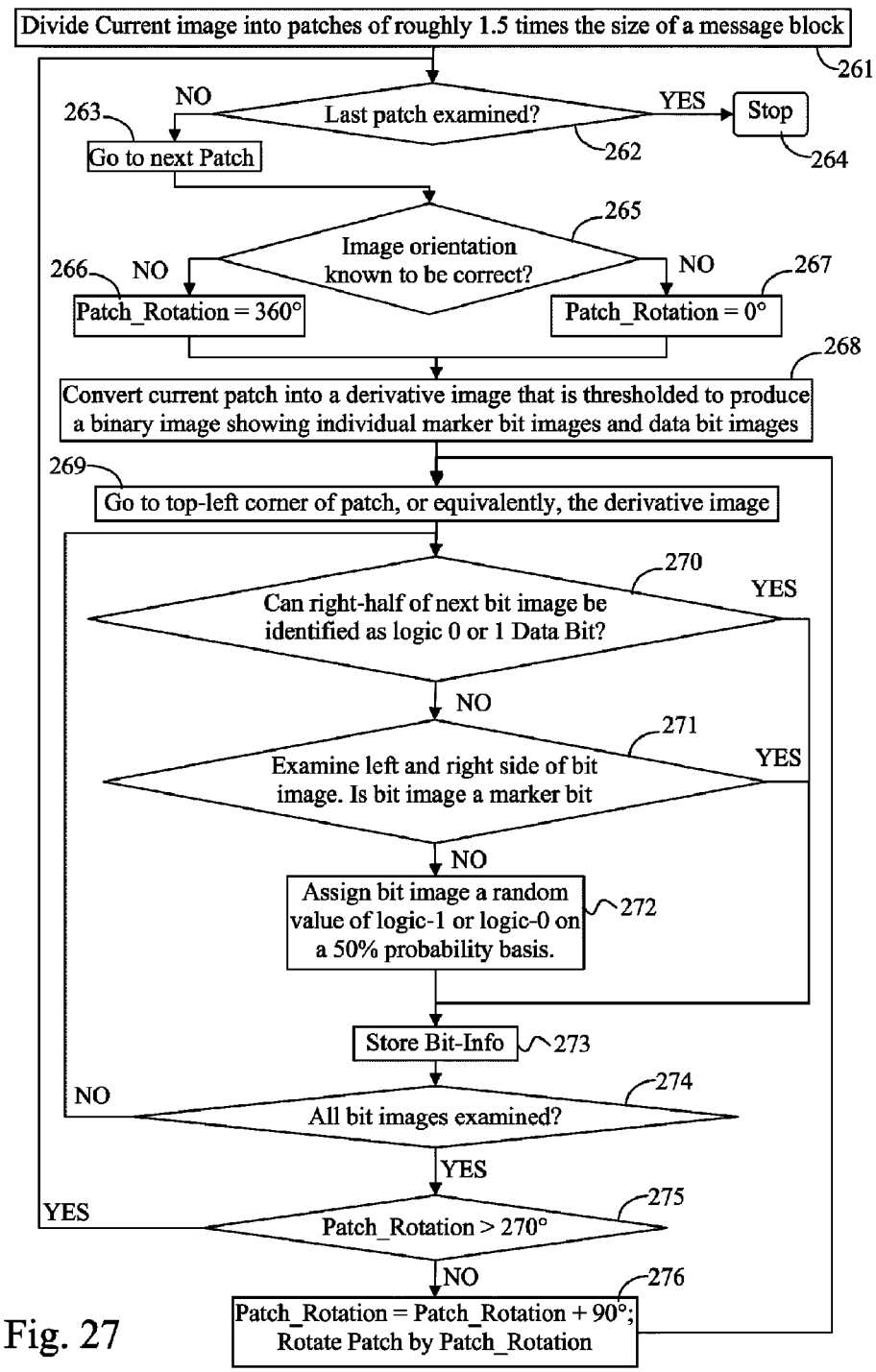
FIG. 27 shows a preferred method of watermark message extraction.

With reference to FIG. 27, message extraction preferably begins by dividing the pre-processed image (such as image 252B of FIG. 26) into patches (sub-step 261) roughly 1.5 times (preferably within 1.1 to 2.0 times) the size of a message block, as shown, for example, in FIGS. 14a and 14b. It is preferred that the patch be bigger than the message block because nonlinear distortions introduced during a scan-and-print cycle may alter the shape and/or dimensions of an image, including the message block. By increasing the size of the patch to be bigger than a message block, one increases the chances of encompassing a complete message block within the patch area. Ideally, a message block should be in the center of the image. The watermark message will be extracted from the message block that lies within the patch area.

If desired, one may extract the watermark message from one watermark block within one patch, and thereby speedup the message extraction process. However, to increase the chances of successfully extracting a complete message, it is presently preferred that multiple patches (and thereby multiple message blocks) be examined for message extraction.

Sub-step 262 addresses the question of whether a watermark message is extracted from more than one patch. If only one patch is used, then the message extraction process ends at the completion of the current patch. Otherwise, the process ends (sub-step 264) after the desired number of patches have been examined.

If the last patch has not yet been examined, then the process goes to the next patch (sub-step 263). When defining a next patch within the image, it is preferred that the center of a current patch (i.e. the location of the center bit within the current patch) be used as a reference point for defining the location and dimensions of the next, adjacent patch. Since an image may be non-uniformly distorted, the center bit within a patch would likely shift along with shifts in the image dimensions due to distortion. Therefore, using the shifting center bit location of a current patch to define the dimension and location of an adjacent patch relative to that center bit (as opposed to using a fixed reference point, such as the upper-left corner of the image) compensates for non-uniform distortions in the image, and improves the chances of enclosing the adjacent watermark block within the adjacent patch.

As stated above, if it is known that the image is a correct orientation (not upside down or otherwise rotated), then there is no need for extra steps for determining a correct orientation of the image, or patch of the image. Thus, if it is not known if the image orientation correct (sub-step 265=NO), then Patch_Rotation is set to 0° in preparation for later rotations to search for the correct orientation. In the presently preferred approach, only four orientations (i.e. rotations of 0°→90°→180°→270°) are checked. At each rotation, the bit extraction process described below is repeated. Thus, a method by which to determine if any additional rotation and bit extraction cycles are pending is to determining if the value of Patch_Rotation exceeds 270° since 270° is the last rotation. Therefore, if the orientation is known to be correct (sub-step 265=YES), then Patch_Rotation may be set to a value higher than 270° (i.e. set to 360° in the present example) to indicate that no additional rotation and bit extraction cycles are necessary.

In sub-step 268, the patch image is turned into a gradient image, which is then thresholded to produce a binary image (such as shown in FIG. 14c, for example) further processing. Preferably the connected components based technique described in reference to FIGS. 6 and 7 is used to generate the binary mask.

Presently, sub-step 268 is applied on a patch-by-patch basis to reduce time requirements. That is, if only one or a few patches are processed, then there is no need to convert the entire image to a binary image. It is to be understood, however, that if the process of sub-step 268 were applied to the entire image prior to defining a patch (in sub-step 261, for example), then there is no need to re-apply this sub-step to each patch individually in sub-step 268, and processing could proceed from sub-step 266/267 directly to sub-step 269, which goes to the top-left corner of the patch to start reading the bit information.

The resultant binary image is a series of white bit images on a black background. Each white bit image is then examined to determine whether it is a marker bit, a logic-0 data bit, or a logic-1 data bit. Reading of each bit image preferably follows the process described above in reference to FIGS. 1-5.

In other words, each bit image is examined to determine whether it can be identified as a marker bit or a data bit. As is explained above in reference to FIG. 4, this may be accomplished by filling-in individual bit images and then subjecting the right half of each bit image to a projection computation. As is illustrated above using arrows in to FIG. 5 (for example arrows A3-A6), the direction of decreasing horizontal projection H and vertical projection V are determined. The horizontal and vertical projection values are then combined to determine whether the bit image is a logic-0 bit or a logic-1 bit.

Sub-step 270 determines if the horizontal and vertical projections of the right-half of the next bit image successfully identify a logic-0 data bit or a logic-1 data bit, as is illustrated by the following table.

| Horizontal Projection | Vertical Projection | Inference |
|---|---|---|
| <0 | <−0.2 | 0 |
| ≥0 | <−0.2 | 1 |

If one these two conditions is met (sub-step 270=YES), and the bit image can be successfully identified as either a logic-0 data bit or a logic-1 data bit, then the identified bit information is stored (stub-step 273).

If neither of these conditions is met (sub-step 270=NO), then the entire filled-out bit image (i.e. both the left and right halves) are examined together to determined if the bit image is a marker bit (sub-step 271). If it is a marker bit (sub-step 271=YES), then the information is stored (sub-step 273).

If the identity of the bit image is still not discernable even after examining both halves of the bit image (sub-step 271=NO), then, figuratively speaking, one flips a coin and assigns the unidentified bit image a value of a logic-0 or a logic-1 (sub-step 272). More specifically, the unidentified bit image is assigned a random value of logic-1 or logic-0 on a 50% probability basis, and the assigned logic bit value is stored (sub-step 273).

Sub-step 271 checks specifically for marker bit patterns to reduce the chances of a data bit pattern being erroneously identified as a marker bit pattern. The consequences of misidentifying a data bit pattern in sub-step 272 (i.e. mistakenly identifying a logic-0 data bit as a logic-1 data bit, or mistakenly identifying a logic-1 data bit as a logic-0 data bit) are reasonably tolerable compared to the effects of mistakenly identifying a data bit pattern as a marker bit pattern. Since the message block region is not well defined (due to the image distortions describe above), and owing to the content-specific nature of the present system, any mistakenly identified marker pattern would erroneously denote the end of a message block row and introduce unwanted errors in a subsequent bit string decoding phase.

If not all the bit images within the current patch have been examined (sub-step 274=NO), then control returns sub-step 270 to examine the next bit image in the current patch. However, if there are no more bit images to be examined, then sub-step 275 determines if the current rotation of the current patch is greater than 270° (sub-step 275). As it was explained above in reference to sub-steps 265-267, if it is known that the image orientation is correct for left-to-right and top-to-bottom reading of the bit images, then there is no need to examine the current patch for correct orientation and control can return to sub-step 262 to check if another patch needs to be examined.

However, if it is not known if the patch is its correct orientation, the patch is rotated 90° (sub-step 276) and sub-steps 269-275 are re-applied to the same patch with the new orientation. In other words, the bit images within the part are re-read in the current rotated orientation. Since sub-step 267 assigned an initial orientation of 0°, the patch is read in each of four orientations, 0°→90°→180°→270°. As is explained above, the specific shape of the data bits and marker bits means that when bit data is not read along its correct orientation, not only is its data bit information not capable of being identified, it is most likely to be misidentified as a marker bit. Therefore, to determine the correct orientation of the patch, one checks to see which of the four orientations (0°, 90°, 180°, or 270°) rendered the greater number of data bits, and that orientation is categorized as the correct orientation.

If multiple patches are read (i.e. multiple patches are examined for data bit extraction), then one may compare which orientation is categorized the correct orientation most often among all the examined patches. The orientation most often categorized as correct, among all the patches, is then deemed to be the overall correct orientation.

Figure 29:
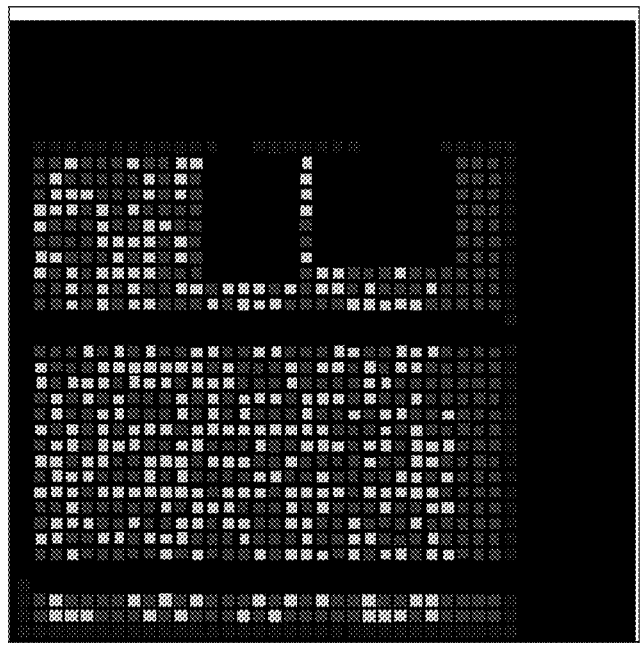
FIG. 29 shows the image grid of FIG. 28 after removing all bit pattern information except for an identified message block.
Figure 28:
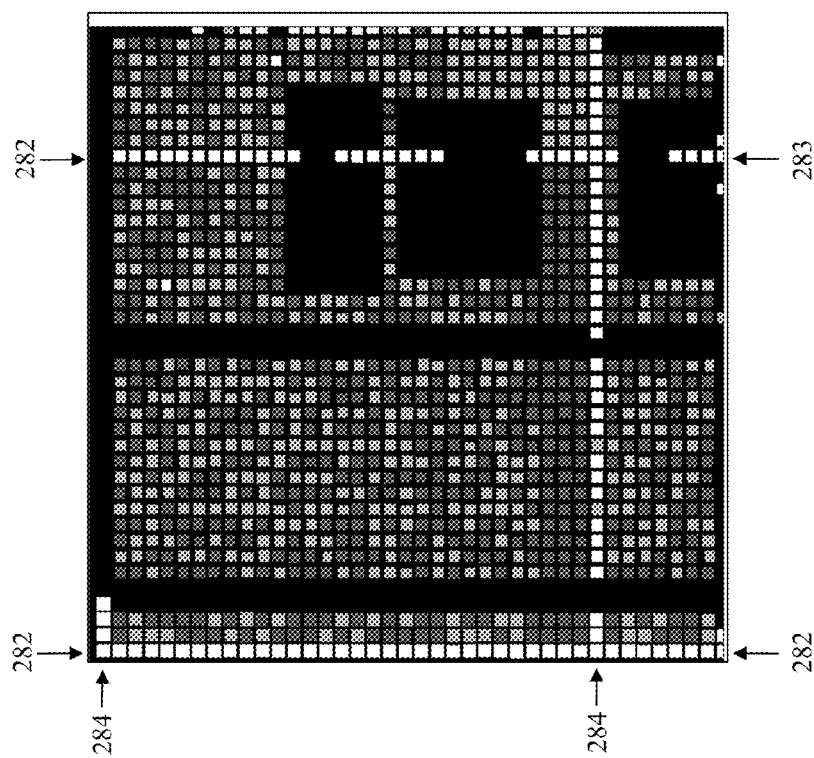
FIG. 28 shows an image grid representation of extracted bit pattern information.

A pictorial example of determining a correct orientation by identifying the orientation that reveals the most data bits is illustrated in reference to FIGS. 28 and 29.

Once all the bits (both data bits and marker bits) have been identified, the bits may be arranged as an image grid, as shown in FIG. 28. In the present example, marker bits are shown as white squares and data bits are shown as shaded squares, when logic 0's and logic 1' having an assigned darkness level for ease of viewing in FIG. 28. Black regions in FIG. 28 identify areas masked out that are to be ignored during reading. Since the objective is to read a message block within the current patch, one first identifies the message block by identifying contiguous sequences of at least 3 or 4 marker bits. These contiguous marker bits define the perimeter of the message block. In the present example of FIG. 28, the message block perimeter is identified arrows 281-284, which delineate a respective sequence of contiguous marker bits. _All bit information not within the identified message block, as well as the perimeter of the message, is then pruned away (i.e. removed or disregarded), as shown in FIG. 29. If correct mode (landscape vs portrait) and orientation has not been identified, then the bit allocation process tries all possible 90° rotations, as described above, before ascertaining the correct mode. For rotations not corresponding to the correct mode and orientation, most of the bit patterns are identified as marker bit patterns and hence no meaningful message data is obtained. Once the correct rotation is identified, correct bits are also identified, thereby generating the correct message.

Figure 30:
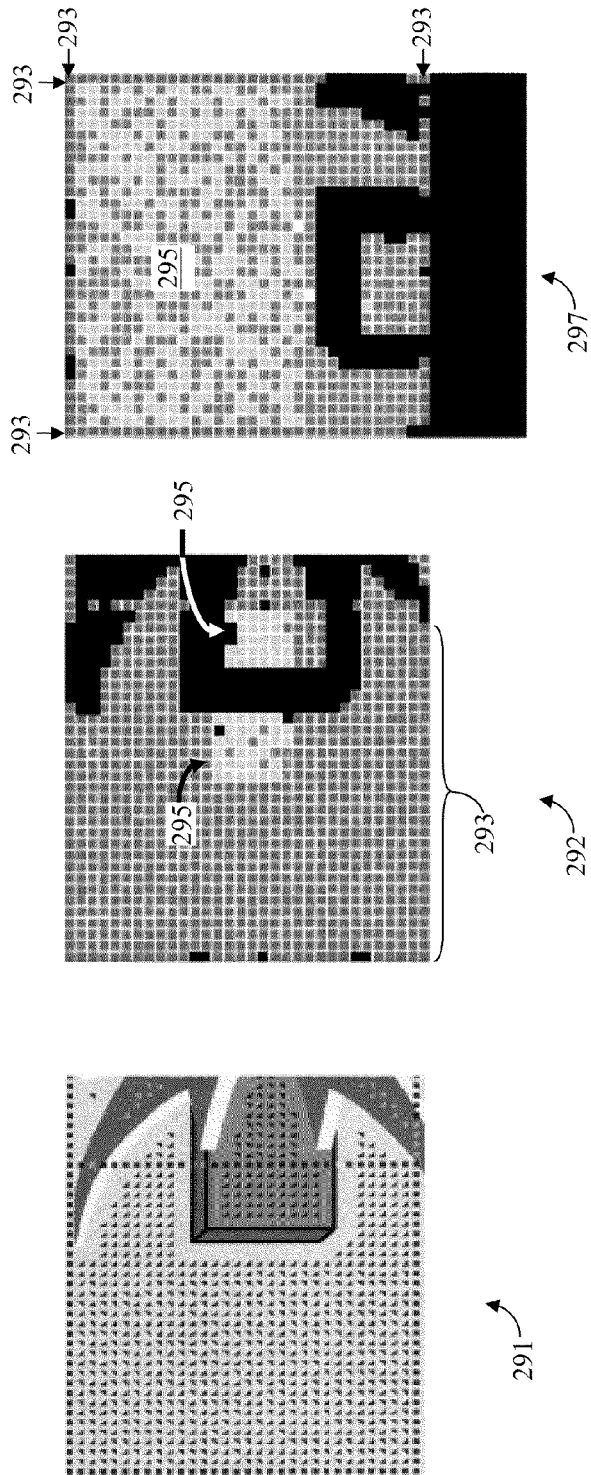
FIG. 30 highlights that a properly of the present invention wherein an improperly oriented image will produced mostly marker bits, while a properly oriented image will produce mostly data bits with marker bits along its perimeter.

With reference to FIG. 30, a second example illustrates this property of the present invention. First image 291 is a first patch prior to application of the process of FIG. 27. Image 292 shows the result of arranging the extraction bit pattern information. In the present example, black areas again indicated masked regions, but marker 293 bits are shown as the darkest shade of gray. Data bits 295 are indicated as two distinct lighter shades of gray (for indicating a logic 0 or a logic 1). As shown, the vast majority of the bit patterns in this orientation are identified as marker bits 293. Image 297 shows the result of rotating image 291 by 270° and re-applying the data extraction process described above. In this case, arrangement of the extracted bit information indicates that maker bits 293 are located only along the perimeter of a message block, and the interior of the message block is comprised predominately of data bits 295.

As is explained above, the present invention preferably uses "centroid feedback", by which the location of a first patch (or message block) is used to identify the location of a second patch (or message block) relative to the first patch. Above, an example is given wherein the first and second patches are consecutive patches in a submitted image. However, any desired patch may be used as the reference patch, but it is preferred that the reference patch selection be updated periodically.

Preferably, the centroid of a correct message block is used to identify the correct centering for the next message block to be read. This step is important due to non-linear scaling introduced by a print-and-scan cycle. As a result of this non-linear scaling, the exact dimensions of pattern images (as well as the dimensions of the message blocks) are not the same as they were during their initial encoding. Hence, the step size for cropping subsequent message blocks in a submitted image is constantly updated based on the centroid of the best message block identified found so far. The centroid identified for the message block is updated for the rotation (landscape/portrait correction) before being used by the subsequent steps.

Selecting the best message block identified so far, makes use of several techniques. First as is explained above, since a single threshold value for binary image generation is not enough to handle all grayscale variations due to the above-discussed non-linear error introduced by a print-and-scan cycle, each message block is thresholded multiple times with a series of increasing threshold values and image bit identification may be attempted at each threshold level. For the results discussed above, thresholds from 25 to 35 with a step size of 2 were used. Lastly, not only do all the messages collected from a single message block go through an error correction phase, the extracted data bit information is applied to a string matching routine to generate the most probable string. As is discussed above, a single message block may have multiple copies of a single message string (or at least the repeated message blocks will contain a copy of the original message string), therefore to identify the most probable message string, one may compare the bit data from the multiple, recovered copies of the message string and identify the message string that repeats itself most consistently.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of inserting watermark codes onto an input image and extracting watermark codes from the input image, comprising:

inserting watermark code onto said input image by:

providing at least one mask block indicating regions of said input image upon which said watermark codes may be written;

providing a message block containing said watermark codes;

dividing said input image into at least one image block, where the number of image blocks corresponding to the number of mask blocks;

assign a one-to-one relationship between said mask Blocks and corresponding image blocks;

for each image block, applying the following steps:
(I) using the current image block's corresponding mask block to create a mask-filtered block;
(II) sub-dividing said mask-filtered block into "message-pattern-size" sub-blocks of equal size and dimension as a corresponding current message block, each message-pattern-size sub-block being divisible into a plurality of pattern image segments having a one-to-one correspondence with the watermark codes in its corresponding message block;
(III) for each message-pattern-size sub-block, cycling through each watermark code in its corresponding message block, and if the message-pattern-size sub-block indicates that the pattern image segment corresponding to the current watermark code is suitable for writing, then writing said watermark code within the image pattern image segment; and extracting watermark codes from the input image by:
applying a pre-processing sequence to said input image to at least assure that said watermark codes are readable in a pre-defined orientation beginning from a predefined corner of the input image's current orientation;
converting said input image to a single channel digital image;
generating a gradient image from said single channel digital image;
defining a memory space hold an extracted message;
defining a lower intensity threshold and an upper intensity threshold, setting a current threshold equal to said lower intensity threshold;
if said current intensity threshold is not greater than said upper intensity threshold, then repeating the following sub-steps, in sequence, until the current intensity threshold is greater than said upper intensity threshold:
(a) increasing said current intensity threshold by a predefined, fixed amount;
(b) binarizing said gradient image using said current intensity threshold to create a binarized image;
(c) applying a message extraction routine to said binarized image and identifying the message extracted by the message extraction routine as a new_message;
(d) if the new_message has a higher confidence of accuracy than the current contents in said memory space, then storing said new_message in said memory space; and
defining the contents of said memory space as the deciphered watermark code.

2. The method of claim 1, wherein in step (III), if the message-pattern-size sub-block indicates that the pattern image segment corresponding to the current watermark code is not suitable for writing then determining if the watermark mark code is data bit or a marker bit, and if the watermark code is a data bit then not writing said watermark code within said image pattern segment, else if the watermark code is a marker bit then writing said watermark code within said image pattern segment irrespective of what the message-pattern-size sub-block indicates.

3. The method of claim 1, wherein the intensity of the watermark code written within a corresponding image pattern image segment is made darker than its surrounding pixels if the average intensity of its surrounding pixels is not less than 255.

4. The method of claim 1, wherein the intensity of the watermark code written within a corresponding image pattern image segment is made lighter than its surrounding pixels if the average intensity of its surrounding pixels is not more than 35.

5. The method of claim 1, wherein said watermark code is arranged into message blocks of a common fixed size and distributed over said input image, and wherein said pre-processing sequence includes the following sequential sub-steps:
(i) setting a current corner confidence parameter equal to 0;
(ii) setting a block_size multiplier equal to 1;
(iii) defining a first memory space to store a best_corner_row_ID parameter, a second memory space to store a best_corner_column_ID parameter, and a third memory space to store a best_corner_rotation_angle parameter;
(iv) defining a fixed series of rotation angles;
(v) IF said block_size is less than a predefined value, THEN incrementing said block_size by a fixed increment value; ELSE skip to sub-step (xiii);
(vi) setting a current_rotation_angle parameter equal to the first angle in said fixed series of rotation angles;
(vii) IF the current_rotation_angle is equal to the last angle within said fixed series of rotation angles, THEN return to sub-step (v), ELSE IF the current_rotation_angle is not equal to the first angle within said fixed series of rotation angles THEN setting said current_rotation_angle parameter equal to the next angle in said fixed series of rotation angles;
(viii) rotating said input image by said current_rotation_angle parameter;
(ix) defining a corner_image be equal to a block section of the upper-left corner of the rotated input image, said block section being of size equal to said common fixed size multiplied by said block_size multiplier;
(x) storing the row index and column index of the best defined corner of a message block within said corner_image as a newRowID parameter and newColumnID parameter, respectively, and attributing a new_corner_confidence level to said best defined corner;
(xi) IF the current_corner_confidence parameter is greater than the new_corner_confidence level, then returning to sub-step (vii), ELSE the current_corner_confidence parameter is set to equal to said new_corner_confidence level, said newRowID is stored in said best_corner_row_ID, said newColumnID is stored in said best_corner_column_ID, and said current_rotation_angle parameter is stored in said best_corner_rotation_angle parameter;
(xii) IF no minimum_threshold_confidence level has been previously defined, THEN return to sub_step (v), ELSE IF the current_corner_confidence parameter is not greater than the minimum_threshold_confidence, THEN return to sub_step (v);
(xiii) rotate and crop the input image to place the best message block corner at the upper-left corner of the input image as determined by parameters best_corner_row_ID, best_corner_column_ID, and best_corner_rotation_angle.

6. The method of claim 5, wherein prior to sub-step (i), said pre-processing sequence further includes providing skew-error compensation and removing white boarders from around the input image.

7. The method of claim 5, wherein prior to sub-step (xii), said pre-processing sequence further includes defining a minimum_threshold_confidence level.

8. The method of claim 5, wherein each of said message blocks has marker bits along its perimeter and logic data bits within its interior, and wherein sub-step (x) includes:
- generate a connected components mask of said corner_image;
- setting the new_corner_confidence level equal to 0;
- fining the marker bit patterns;
- setting newRowID equal to the row index of the row with maximum number of marker bits horizontally;
- defining a row_confidence as the number of marker bits in row newRowID divided by the sum of the number of marker bits and number of logic data bits in row newRowID;
- setting newColumnID equal the column index of the column with maximum number of marker bits vertically;
- defining a column_confidence as the number marker bits in column newColumnID divided by the sum of the number of marker bits and number of logic data bits in column newColumnID;
- setting new_corner_confidence level equal to the average of row_confidence and column_confidence.

9. The method of claim 1, wherein said watermark code is arranged into a plurality of message blocks of a common fixed size and distributed over said input image, each of said message blocks having marker bits along its perimeter and data bits within its interior, and wherein said step (c) includes the following sub-steps:
   (1) dividing said binarized image into patches of size larger than, and proportional to, the size of a message block, and examining each patch in a predefined patch sequence;
   (2) IF the last patch has been examined then ending step (c);
   (3) selecting the next patch in the patch sequence as a current patch;
   (4) IF the orientation of the binarized image is in a known predefined orientation, then set a Patch_Rotation parameter to 360, ELSE set the Patch_Rotation parameter to 0;
   (5) converting the current patch into a derivative image that is thresholded to produce a binary image showing individual marker bit images and data bit images;
   (6) identifying the top-left corner of the derivative image;
   (7) examining the next bit image, IF the right-half of this current bit image can be identified as a logic 0 or a logic 1 data bit, THEN skipping to sub-step (8);
   ELSE IF the combined left-half and right-half of the current bit image together can be identified as a marker bit, THEN skipping to sub-step (8);
   ELSE assigning the current bit image a random value of logic-1 or logic-0 on a 50% probability basis;
   (8) storing the bit information of the current bit image;
   (9) IF all bit images have not yet been examined, then return to sub-step (7);
   (10) IF the Patch_Rotation parameter is greater than 270, THEN returning to sub-step (2), ELSE increment the Patch_Rotation parameter by a value of 90;
   (11) rotating the current patch by a number of degree equal to the Patch_Rotation parameter, and return to sub-step (6).

10. A method of inserting watermark codes onto an input image, comprising:
- providing at least one mask block indicating regions of said input image upon which said watermark codes may be written;
- providing a message block containing said watermark codes;
- dividing said input image into at least one image block, where the number of image blocks corresponding to the number of mask blocks;
- assign a one-to-one relationship between said mask Blocks and corresponding image blocks;
- for each image block, applying the following steps:
   (I) using the current image block's corresponding mask block to create a mask-filtered block;
   (II) sub-dividing said mask-filtered block into "message-pattern-size" sub-blocks of equal size and dimension as a corresponding current message block, each message-pattern-size sub-block being divisible into a plurality of pattern image segments having a one-to-one correspondence with the watermark codes in its corresponding message block;
   (III) for each message-pattern-size sub-block:
      cycling through each watermark code in its corresponding message block, and:
      if the message-pattern-size sub-block indicates that the pattern image segment corresponding to the current watermark code is suitable for writing, then writing said watermark code within the image pattern image segment.

11. The method of claim 10, wherein in step (III), if the message-pattern-size sub-block indicates that the pattern image segment corresponding to the current watermark code is not suitable for writing then determining if the watermark code is data bit or a marker bit, and if the watermark code is a data bit then not writing said watermark code within said image pattern segment, else if the watermark code is a marker bit then writing said watermark code within said image pattern segment irrespective of what the message-pattern-size sub-block indicates.

12. The method of claim 10, wherein the intensity of the watermark code written within a corresponding image pattern image segment is made darker than its surrounding pixels if the average intensity of its surrounding pixels is not less than 255.

13. The method of claim 10, wherein the intensity of the watermark code written within a corresponding image pattern image segment is made lighter than its surrounding pixels if the average intensity of its surrounding pixels is not more than 35.

14. The method of claim 10, wherein pattern image segment suitable for writing correspond to background pixels in said input image, and pattern image segments not suitable for writing correspond to foreground pixels in said input image.

15. A method of extracting and deciphering a watermark code from an input image, comprising:
- applying a pre-processing sequence to said input image to at least assure that said watermark codes are readable in a pre-defined orientation beginning from a predefined corner of the input image's current orientation;
- converting said input image to a single channel digital image;
- generating a gradient image from said single channel digital image;
- defining a memory space hold an extracted_message;
- defining a lower intensity threshold and an upper intensity threshold, setting a current threshold equal to said lower intensity threshold;
- if said current intensity threshold is not greater than said upper intensity threshold, then repeating the following sub-steps, in sequence, until the current intensity threshold is greater than said upper intensity threshold:

(a) increasing said current intensity threshold by a predefined, fixed amount;
(b) binarizing said gradient image using said current intensity threshold to create a binarized image;
(c) applying a message extraction routine to said binarized image and identifying the message extracted by the message extraction routine as a new_message;
(d) if the new_message has a higher confidence of accuracy than the current contents in said memory space, then storing said new_message in said memory space; and defining the contents of said memory space as the deciphered watermark code.

16. The method of claim 15, wherein said generating of the gradient image from said single channel digital image uses the following relation: $\nabla I = \nabla Ix + \nabla Iy$.

17. The method of claim 15, wherein said pre-processing sequence further crops said input image to remove any white boarder around said input image, and rotates said input image so that said watermark codes are readable from left-to-right and from top-to-bottom starting from the upper left corner of the cropped input image.

18. The method of claim 15, wherein said watermark code is arranged into message blocks of a common fixed size and distributed over said input image, and wherein said pre-processing sequence includes the following sequential sub-steps:
(ii) setting a current corner confidence parameter equal to 0;
(ii) setting a block_size multiplier equal to 1;
(iii) defining a first memory space to store a best_corner_row_ID parameter, a second memory space to store a best_corner_column_ID parameter, and a third memory space to store a best_corner_rotation_angle parameter;
(iv) defining a fixed series of rotation angles;
(v) IF said block_size is less than a predefined value, THEN incrementing said block_size by a fixed increment value; ELSE skip to sub-step (xiii);
(vi) setting a current_rotation_angle parameter equal to the first angle in said fixed series of rotation angles;
(vii) IF the current_rotation_angle is equal to the last angle within said fixed series of rotation angles, THEN return to sub-step (v), ELSE IF the current_rotation_angle is not equal to the first angle within said fixed series of rotation angles THEN setting said current_rotation_angle parameter equal to the next angle in said fixed series of rotation angles;
(viii) rotating said input image by said current_rotation_angle parameter;
(ix) defining a corner_image be equal to a block section of the upper-left corner of the rotated input image, said block section being of size equal to said common fixed size multiplied by said block_size multiplier;
(x) storing the row index and column index of the best defined corner of a message block within said corner_image as a newRowID parameter and newColumnID parameter, respectively, and attributing a new_corner_confidence level to said best defined corner;
(xi) IF the current corner confidence parameter is greater than the new_corner_confidence level, then returning to sub-step (vii), ELSE the current_corner_confidence parameter is set to equal to said new_corner_confidence level, said newRowID is stored in said best_corner_row_ID, said newColumnID is stored in said best_corner_column_ID, and said current_rotation_angle parameter is stored in said best_corner_rotation_angle parameter;

(xii) IF no minimum_threshold_confidence level has been previously defined, THEN return to sub_step (v), ELSE IF the current_corner_confidence parameter is not greater than the minimum_threshold_confidence, THEN return to sub_step (v);
(xiii) rotate and crop the input image to place the best message block corner at the upper-left corner of the input image as determined by parameters best_corner_row_ID, best_corner_column_ID, and best_corner_rotation_angle.

19. The method of claim 18, wherein prior to sub-step (i), said pre-processing sequence further includes providing skew-error compensation and removing white boarders from around the input image.

20. The method of claim 18, wherein prior to sub-step (xii), said pre-processing sequence further includes defining a minimum_threshold_confidence level.

21. The method of claim 18, wherein each of said message blocks has marker bits along its perimeter and logic data bits within its interior, and wherein sub-step (x) includes:
generate a connected components mask of said corner_image;
setting the new_corner_confidence level equal to 0;
fining the marker bit patterns;
setting newRowID equal to the row index of the row with maximum number of marker bits horizontally;
defining a row_confidence as the number of marker bits in row newRowID divided by the sum of the number of marker bits and number of logic data bits in row new RowID;
setting newColumnID equal the column index of the column with maximum number of marker bits vertically;
defining a column_confidence as the number marker bits in column newColumnID divided by the sum of the number of marker bits and number of logic data bits in column newColumnID;
setting new_corner_confidence level equal to the average of row_confidence and column_confidence.

22. The method of claim 15, wherein said watermark code is arranged into a plurality of message blocks of a common fixed size and distributed over said input image, each of said message blocks having marker bits along its perimeter and data bits within its interior, and wherein said step (c) includes the following sub-steps:
(1) dividing said binarized image into patches of size larger than, and proportional to, the size of a message block, and examining each patch in a predefined patch sequence;
(2) IF the last patch has been examined then ending step (c);
(3) selecting the next patch in the patch sequence as a current patch;
(4) IF the orientation of the binarized image is in a known predefined orientation, then set a Patch_Rotation parameter to 360, ELSE set the Patch_Rotation parameter to 0;
(5) converting the current patch into a derivative image that is thresholded to produce a binary image showing individual marker bit images and data bit images;
(6) identifying the top-left corner of the derivative image;
(7) examining the next bit image, IF the right-half of this current bit image can be identified as a logic 0 or a logic 1 data bit, THEN skipping to sub-step (8);
ELSE IF the combined left-half and right-half of the current bit image together can be identified as a marker bit, THEN skipping to sub-step (8);
ELSE assigning the current bit image a random value of logic-1 or logic-0 on a 50% probability basis;

(8) storing the bit information of the current bit image;
(9) IF all bit images have not yet been examined, then return to sub-step (7);
(10) IF the Patch_Rotation parameter is greater than 270, THEN returning to sub-step (2), ELSE increment the Patch_Rotation parameter by a value of 90;
(11) rotating the current patch by a number of degree equal to the Patch_Rotation parameter, and return to sub-step (6).

23. The method of claim 15, wherein in step (d) the confidence of accuracy is determined by comparing the characters in the currently created message with characters identified in previous cycles and determined the most probably character string by comparing the frequency of occurrence of each character in the character string in its particular location within the character string.

* * * * *